(12) United States Patent
Bhattacharyya et al.

(10) Patent No.: US 10,671,917 B1
(45) Date of Patent: Jun. 2, 2020

(54) SYSTEM FOR MAPPING EXTRACTED NEURAL ACTIVITY INTO NEUROCEPTUAL GRAPHS

(71) Applicant: HRL Laboratories, LLC, Malibu, CA (US)

(72) Inventors: Rajan Bhattacharyya, Sherman Oaks, CA (US); James Benvenuto, Beverly Hills, CA (US); Vincent De Sapio, Westlake Village, CA (US); Michael J. O'Brien, Culver City, CA (US); Kang-Yu Ni, Calabasas, CA (US); Kevin R. Martin, Oak Park, CA (US); Ryan M. Uhlenbrock, Calabasas, CA (US); Rachel Millin, Seattle, WA (US); Matthew E. Phillips, Calabasas, CA (US); Hankyu Moon, Oak Park, CA (US); Qin Jiang, Oak Park, CA (US); Brian L. Burns, West Hollywood, CA (US)

(73) Assignee: HRL Laboratories, LLC, Malibu, CA (US)

( * ) Notice: Subject to any disclaimer, the term of this patent is extended or adjusted under 35 U.S.C. 154(b) by 839 days.

(21) Appl. No.: 15/335,414

(22) Filed: Oct. 26, 2016

Related U.S. Application Data

(63) Continuation-in-part of application No. 15/150,998, filed on May 10, 2016, now abandoned, which is a
(Continued)

(51) Int. Cl.
*G06F 17/50* (2006.01)
*G06F 7/00* (2006.01)
(Continued)

(52) U.S. Cl.
CPC .............. *G06N 3/08* (2013.01); *G06F 17/16* (2013.01)

(58) Field of Classification Search
CPC ....................................................... G06N 3/08
(Continued)

(56) References Cited

U.S. PATENT DOCUMENTS

| 6,865,567 B1 | 3/2005 | Oommen et al. |
| 8,190,422 B2 | 5/2012 | Ascoli et al. |

(Continued)

FOREIGN PATENT DOCUMENTS

| CN | 101699444 A | 4/2010 |
| JP | 2013-235398 | 11/2013 |

(Continued)

OTHER PUBLICATIONS

M. Westerlund and L. Pylkkänen. Characterizing the role of the left anterior temporal lobe in combinatory processes. The Society for the Neurobiology of Language Abstracts, 2011, p. 138.

(Continued)

*Primary Examiner* — Brandon S Cole
(74) *Attorney, Agent, or Firm* — Tope-McKay & Associates

(57) ABSTRACT

Described is a system for neural decoding of neural activity. Using at least one neural feature extraction method, neural data that is correlated with a set of behavioral data is transformed into sparse neural representations. Semantic features are extracted from a set of semantic data. Using a combination of distinct classification modes, the set of semantic data is mapped to the sparse neural representations, and new input neural data can be interpreted.

19 Claims, 12 Drawing Sheets

Related U.S. Application Data continuation-in-part of application No. 14/978,814, filed on Dec. 22, 2015, which is a continuation-in-part of application No. 14/869,907, filed on Sep. 29, 2015, now Pat. No. 10,044,581, which is a continuation-in-part of application No. 14/807,083, filed on Jul. 23, 2015, now Pat. No. 10,360,506, which is a continuation-in-part of application No. 14/626,915, filed on Feb. 19, 2015, now Pat. No. 10,172,532, which is a continuation-in-part of application No. 14/489,313, filed on Sep. 17, 2014, now Pat. No. 9,646,248.

(60) Provisional application No. 62/246,515, filed on Oct. 26, 2015, provisional application No. 62/195,876, filed on Jul. 23, 2015, provisional application No. 62/095,574, filed on Dec. 22, 2014, provisional application No. 62/057,707, filed on Sep. 30, 2014, provisional application No. 62/028,083, filed on Jul. 23, 2014, provisional application No. 62/028,171, filed on Jul. 23, 2014.

(51) Int. Cl.

| | | |
|---|---|---|
| G06K 9/46 | (2006.01) | |
| G06N 5/04 | (2006.01) | |
| G06K 9/62 | (2006.01) | |
| G06N 3/08 | (2006.01) | |
| G06F 17/16 | (2006.01) | |

(58) Field of Classification Search
USPC .................................................. 706/1–62
See application file for complete search history.

(56) References Cited

U.S. PATENT DOCUMENTS

| | | | |
|---|---|---|---|
| 8,204,623 | B1 | 6/2012 | Bhattacharyya |
| 8,285,052 | B1 | 10/2012 | Bhattacharyya |
| 8,406,989 | B1 | 3/2013 | Bhattacharyya |
| 8,699,767 | B1 | 4/2014 | Khosla |
| 8,990,139 | B1 | 3/2015 | Howard |
| 9,002,762 | B1 | 4/2015 | Howard |
| 9,378,377 | B1 | 6/2016 | Kuan |
| 9,646,248 | B1 | 5/2017 | Benvenuto |
| 10,084,819 | B1 | 9/2018 | Nogin |
| 10,360,506 | B2 | 7/2019 | O'Brien et al. |
| 2004/0010393 | A1 | 1/2004 | Barney |
| 2005/0147297 | A1 | 7/2005 | McLaughlin |
| 2006/0112108 | A1 | 5/2006 | Eklund et al. |
| 2006/0212470 | A1 | 9/2006 | Zhang |
| 2009/0306491 | A1* | 12/2009 | Haggers ............ A61B 5/04001 600/373 |
| 2009/0319451 | A1 | 12/2009 | Mirbach |
| 2012/0084242 | A1* | 4/2012 | Levin ................ B82Y 10/00 706/46 |
| 2013/0184558 | A1 | 7/2013 | Gallant |
| 2013/0238622 | A1 | 9/2013 | Tang |
| 2014/0236548 | A1 | 8/2014 | Conduit |
| 2014/0324747 | A1* | 10/2014 | Crowder ............ G06N 3/086 706/18 |
| 2015/0100540 | A1 | 4/2015 | Sweeney et al. |
| 2015/0213327 | A1 | 7/2015 | Rosr |
| 2015/0248615 | A1* | 9/2015 | Parra ................ A61B 5/7275 706/12 |
| 2017/0316318 | A1 | 11/2017 | O'Brien |
| 2019/0230107 | A1 | 7/2019 | De Sapio |

FOREIGN PATENT DOCUMENTS

| | | |
|---|---|---|
| WO | 2010-147010 | 12/2010 |
| WO | 2013-144552 | 10/2013 |
| WO | WO2013144552 A1 | 10/2013 |
| WO | WO2016043846 A3 | 8/2016 |

OTHER PUBLICATIONS

Essa Yacoub, Amir Shmuel, Josef Pfeuffer, Van De Moortele, Gregor Adriany, Peter Andersen, J Thomas Vaughan, Hellmut Merkle, Kamil Ugurbil, Xiaoping Hu, et al. Imaging brain function in humans at 7 tesla. Magnetic Resonance in Medicine, 45 (4): pp. 588-594, 2001.

Essa Yacoub, Timothy Q Duong, Van De Moortele, Martin Lindquist, Gregor Adriany, Seong-Gi Kim, Kâmil Ugurbil, Xiaoping Hu, et al. Spin-echo fmri in humans using high spatial resolutions and high magnetic fields. Magnetic resonance in medicine, 49 (4): pp. 655-664, 2003.

Essa Yacoub, Noam Harel, and Kâmil Ugurbil. High-field fmri unveils orientation columns in humans. Proceedings of the National Academy of Sciences, 105 (30): pp. 10607-10612, 2008.

Wille. Ordered Sets, chapter Restructuring Lattice Theory: an approached based on hierarchies of concepts, pp. 445-470. Reidel, Dordrecht-Boston, 1982.

Murphy B. Chang, K.M. and M.A. Just. A latent feature analysis of the neural representation of conceptual knowledge. In Proceedings of the 2012 Conference of the North American Chapter of the Association for Computational Linguistics: Human Language Technologies, Montreal, Canada, pp. 377-381., 2012.

Todd M Gureckis and Bradley C Love. Bridging levels: Using a cognitive model to connect brain and behavior in category learning. In Proceedings of the 28th Annual Meeting of the Cognitive Science Society, pp. 315-320, 2006.

Bradley C Love and Todd M Gureckis. Models in search of a brain. Cognitive, Affective, & Behavioral Neuroscience, 7 (2): pp. 90-108, 2007.

Bradley C Love, Douglas L Medin, and Todd M Gureckis. Sustain: a network model of category learning. Psychological review, 2004, vol. 111, No. 2, pp. 309-332.

William D. Penny, Karl J. Friston, John T. Ashburner, Stefan J. Kiebel, and Thomas E. Nichols, editors. Statistical Parametric Mapping: The Analysis of Functional Brain Images. Academic Press, 2007, Chapter 8.

Martin Havlicek, Karl J Friston, Jiri Jan, Milan Brazdil, and Vince D Calhoun. Dynamic modeling of neuronal responses in fmri using cubature kalman filtering. NeuroImage 56 (2011), pp. 2109-2128.

Tom M Mitchell, Svetlana V Shinkareva, Andrew Carlson, Kai-Min Chang, Vicente L Malave, Robert A Mason, and Marcel Adam Just. Predicting human brain activity associated with the meanings of nouns. science, 320(5880): pp. 1191-1195, 2008.

Johanna M Zumer, Matthew J Brookes, Claire M Stevenson, Susan T Francis, and Peter G Morris. Relating bold fmri and neural oscillations through convolution and optimal linear weighting. Neuroimage, 49(2): pp. 1479-1489, 2010.

Fikret Isk Karahanoglu, César Gaudes Caballero, François Lazeyras, and Dimitri Van De Ville. Total activation: Fmri deconvolution through spatio-temporal regularization. NeuroImage 73 (2013), pp. 121-134.

C. C. Gaudes, F. I. Karahanoglu, F. Lazeyras, and D. Van De Ville. Structured sparse deconvolution for paradigm free mapping of functional mri data. In Biomedical Imaging (ISBI), 2012 9th IEEE International Symposium on, pp. 322-325. IEEE, 2012.

Kangjoo Lee, Sungho Tak, and Jong Chul Ye. A data-driven sparse GLM for fMRI analysis using sparse dictionary learning with mdl criterion. Medical Imaging, IEEE Transactions on, 30(5): pp. 1076-1089, 2011.

Härdle, Wolfgang; Simar, Léopold, "Canonical Correlation Analysis," Applied Multivariate Statistical Analysis, pp. 321-330, 2007.

Martin Maechler and Douglas Bates, "2nd Introduction to the Matrix package," https://cran.r-project.org/web/packages/Matrix/vignettes/Intro2Matrix.pdf , Sep. 2006, pp. 1-9.

Ganter, B. & Wille, R. (1998).Formal Concept Analysis: Mathematical Foundations. Springer-Verlag, Chapter 1, pp. 16-62.

Carpineto, C. & Romano, G. (2004). Concept Data Analysis: Theory and Applications. Wiley, Chapter 2, pp. 25-77.

Carpineto, C. & Romano, G. (2004). Concept Data Analysis: Theory and Applications. Wiley, Chapter 3, pp. 83-104.

(56) References Cited

OTHER PUBLICATIONS

Endres, D., Foldiak, P., Priss, U. (2010), An application of formal concept analysis to semantic neural decoding. Annals of Mathematics and Artificial Intelligence 57(3-4), 233-248.

Endres, D., Adam, R., Giese, M.A. & Noppeney, U. (2012). Understanding the Semantic Structure of Human fMRI Brain Recording with Formal Concept Analysis. Formal Concept Analysis—10th International Conference, ICFCA 2012, Leuven, Belgium, May 7-10, 2012. Proceedings: 96-111.

Lotte, F., Congedo, M., Lécuyer, A., Lamarche, F., & Arnaldi, B. (2007). A review of classification algorithms for EEG-based brain—computer interfaces. Journal of neural engineering, 4.

Mourao-Miranda, J., Friston, K. J., & Brammer, M. (2007). Dynamic discrimination analysis: a spatial-temporal SVM. NeuroImage, 36(1), 88.

Naselaris, T., Kay, K. N., Nishimoto, S., & Gallant, J. L. (2011). Encoding and decoding in fMRI. Neuroimage, 56(2), 400-410.

Pereira, F., Detre, G., & Botvinick, M. (2011). Generating text from functional brain images. Frontiers in human neuroscience, 5.

Landauer, T.K., Foltz, P.W., & Lahm, D. (1998). Introduction to Latent Semantic Analysis. Discourse Processes, 25, 259-284.

Notice of Allowance for U.S. Appl. No. 14/489,313, dated Jan. 4, 2017.

G. Birkhoff. Lattice Theory, 3rd edition. Amer. Math Soc. Coll. Publ., 1973, Chapter 1.

Anderson, Michael L., and Tim Oates. "A critique of multi-voxel pattern analysis." In Proceedings of the 32nd Annual Meeting of the Cognitive Science Society, ed. S. Ohlsson and R. Catrambone, pp. 1511-1516. 2010.

J Ashburner and K Friston. Multimodal image coregistration and partitioning—A unified framework. Neuroimage, 6 (3): pp. 209-217, 1997.

John Ashburner and Karl J Friston. Unified segmentation. Neuroimage, 26 (3): pp. 839-851, 2005.

Brian Avants, Paramveer Dhillon, Benjamin Kandel, Philip Cook, Corey McMillan, Murray Grossman, and James Gee. Eigenanatomy improves detection power for longitudinal cortical change. Medical Image Computing and Computer-Assisted Intervention—MICCAI 2012, pp. 206-213, 2012.

Brian B Avants, M Epstein, CL Epstein, M Grossman, and James C Gee. Symmetric diffeomorphic image registration with cross-correlation: Evaluating automated labeling of elderly and neurodegenerative brain. Medical image analysis, 12 (1): pp. 26-41, 2008.

Brian B Avants, Philip A Cook, Lyle Ungar, James C Gee, and Murray Grossman. Dementia induces correlated reductions in white matter integrity and cortical thickness: a multivariate neuroimaging study with sparse canonical correlation analysis. NeuroImage, 50 (3): pp. 1004-1016, 2010.

Brian B Avants, Nicholas J Tustison, Gang Song, Philip A Cook, Arno Klein, and James C Gee. A reproducible evaluation of ants similarity metric performance in brain image registration. Neuroimage, 54 (3): pp. 2033-2044, 2011.

R Harald Baayen, Douglas J Davidson, and Douglas M Bates. Mixed-effects modeling with crossed random effects for subjects and items. Journal of memory and language, 59 (4): pp. 390-412, 2008.

L. W. Barsalou. Grounded cognition. Annual Review of Psychology, 59: pp. 617-645, 2008.

Douglas K Bernis and Liina Pylkkänen. Simple composition: A magnetoencephalography investigation into the comprehension of minimal linguistic phrases. The Journal of Neuroscience, 31 (8): pp. 2801-2814, 2011.

E. Bialystok and M. Viswanathan. Components of executive control with advantages for bilingual children in two vultures. Cognition, 112 (3): pp. 494-500, 2009.

J. R. Binder, R. H. Desai, W. W. Graves, and L. L. Conant. Where is the semantic system? a critical review and meta-analysis of 120 functional neuroimaging studies. Cerebral Cortex, 19 (12): pp. 2767-2796, 2009.

M. F. Bonner and M. Grossman. Gray matter density of auditory association cortex relates to knowledge of sound concepts in primary progressive aphasia. The Journal of Neuroscience, 32 (23): pp. 7986-7991, 2012.

M. F. Bonner, J. E. Peelle, P. A. Cook, and M. Grossman. Heteromodal conceptual processing in the angular gyrus. NeuroImage, 71: pp. 175-186, 2013.

Michael F. Bonner and Amy R. Price. Where is the anterior temporal lobe and what does it do? The Journal of Neuroscience, 33 (10): pp. 4213-4215, 2013. doi: 10.1523/JNEUROSCI.0041-13.2013.

J. Brennan and L. Pylkkänen. Processing events: Behavioral and neuromagnetic correlates of aspectual coercion. Brain and Language, 106 (2): pp. 132-143, 2008.

J. Brennan and L. Pylkkänen. The time-course and spatial distribution of brain activity associated with sentence processing. NeuroImage 60 (2012), pp. 1139-1148.

C. Burgess. From simple associations to the building blocks of language: Modeling meaning in memory with the hal model. Behavior Research Methods, 30 (2): pp. 188-198, 1998.

A. Caramazza and J. R. Shelton. Domain-specific knowledge systems in the brain: The animate-inanimate distinction. Journal of cognitive neuroscience, 10 (1): pp. 1-34, 1998.

G. N. Carlson. Thematic roles and their role in semantic interpretation. Linguistics, 22 (3): pp. 259-280, 1984.

G. N. Carlson and M. K. Tanenhaus. Thematic roles and language comprehension. Syntax and semantics, 21: pp. 263-288, 1988.

C. Carpineto and G. Romano. Concept Data Analysis: Theory and Applications. Wiley, 2004, Chapter 2.

Valerie A Carr, Jesse Rissman, and Anthony D Wagner. Imaging the human medial temporal lobe with high-resolution fmri. Neuron, 65 (3): pp. 298-308, 2010.

B. A. Colaianne and M. G. Powell. Developing transferrable geospatial skills in a liberal arts context. Journal of Geoscience Education, 59 (2): pp. 93-97, 2011.

B. A. Davey and H. A. Priestley. Introduction to lattices and order. Cambridge university press, 2002, Chapter 2.

B. A. Davey and H. A. Priestley. Introduction to lattices and order. Cambridge university press, 2002, Chapter 3.

F. Doshi, K. T. Miller, J. Van Gael, and Y. W. Teh. Variational inference for the indian buffet process. In Proceedings of the International Conference on Artificial Intelligence and Statistics, 2008, pp. 137-144.

D. Endres, P. Foldiak, and U. Priss. An application of formal concept analysis to semantic neural decoding. Annals of Mathematics and Artificial Intelligence, 57 (3): pp. 233-248, 2009.

D. Endres, R. Adam, M. Giese, and U. Noppeney. Understanding the semantic structure of human fMRI brain recordings with formal concept analysis. In In Proceedings of the 10th international conference on Formal Concept Analysis, pp. 96-111, 2012.

T. Fawcett. An introduction to ROC analysis. Pattern recognition letters, 27 (8): pp. 861-874, 2006.

David A Feinberg, Steen Moeller, Stephen M Smith, Edward Auerbach, Sudhir Ramanna, Matt F Glasser, Karla L Miller, Kamil Ugurbil, and Essa Yacoub. Multiplexed echo planar imaging for sub-second whole brain fmri and fast diffusion imaging. PLoS One, Dec. 2010, vol. 5, Issue 12, e15710, pp. 1-11.

C. Fellbaum. Wordnet: An electronic lexical database. A Bradford Book, 1998, Chapter 4.

Karl J Friston, John Ashburner, Christopher D Frith, J-B Poline, John D Heather, and Richard SJ Frackowiak. Spatial registration and normalization of images. Human brain mapping, 3 (3): pp. 165-189, 1995.

Bernhard Ganter, Rudolf Wille, and Rudolf Wille. Formal concept analysis. Springer Berlin, 1999, Chapter 1.

G. Garbin, S. Collina, and P. Tabossi. Argument structure and morphological factors in noun and verb processing: An fMRI study. PLOS ONE, Sep. 2012, vol. 7, Issue 9, e45091, pp. 1-7.

Robert Goldstone. An efficient method for obtaining similarity data. Behavior Research Methods, 26 (4): pp. 381-386, 1994.

Thomas L Griffiths and Zoubin Ghahramani. The Indian buffet process: An introduction and review. Journal of Machine Learning Research, 12: pp. 1185-1224, 2011.

(56) References Cited

OTHER PUBLICATIONS

M. Grossman, P. Koenig, C. DeVita, G. Glosser, D. Alsop, J. Detre, and J. Gee. Neural representation of verb meaning: an fMRI study. Human brain mapping, 15 (2): pp. 124-134, 2001.
M. Grossman, P. Koenig, C. DeVita, G. Glosser, D. Alsop, J. Detre, and J. Gee. The neural basis for category-specific knowledge: an fMRI study. NeuroImage, 15 (4): pp. 936-948, 2002.
M. Grossman, J. E. Peelle, E. E. Smith, C. T. McMillan, P. Cook, J. Powers, M. Dreyfuss, M. F. Bonner, L. Richmond, A. Boller, E. Camp, and L. Burkholder. Category-specific semantic memory: Converging evidence from Bold fMRI and Alzheimer's disease. NeuroImage 68 (2013), pp. 263-274.
Todd M Gureckis and Bradley C Love. Direct associations or internal transformations? exploring the mechanisms underlying sequential learning behavior. Cognitive science, 34 (1): pp. 10-50, 2010.
Angela H Gutchess, Trey Hedden, Sarah Ketay, Arthur Aron, and John De Gabrieli. Neural differences in the processing of semantic relationships across cultures. Social cognitive and affective neuroscience, 5 (2-3): pp. 254-263, 2010.
E. Halgren, R. P. Dhond, N. Christensen, C. Van Petten, K. Marinkovic, J. D. Lewine, and A. M. Dale. N400-like magnetoencephalography responses modulated by semantic context, word frequency, and lexical class in sentences. NeuroImage, 17 (3): pp. 1101-1116, 2002.
D. R. Heise. Expressive order: Confirming sentiments in social actions. Springer, 2006, Chapter 2.
Alexander H. Huth, Shinji Nishimoto, An T. Vu, and Jack L. Gallant. A continuous semantic space describes the representation of thousands of object and action categories across the human brain. Neuron, 76: pp. 1210-1224, 2012.
P. Indefrey. A meta-analysis of hemodynamic studies on first and second language processing: Which suggested differences can we trust and what do they mean? Language Learning, 56 (s1): pp. 279-304, 2006.
D. Kemmerer, J. G. Castillo, T. Talavage, S. Patterson, and C. Wiley. Neuroanatomical distribution of five semantic components of verbs: Evidence from fMRI. Brain and language, 107 (1): pp. 16-43, 2008.
P. Koenig and M. Grossman. Neural basis of semantic memory, chapter Process and content in semantic memory, pp. 247-264. Cambridge University Press, 2007.
Z. Kourtzi and N. Kanwisher. Activation in human mt/mst by static images with implied motion. Journal of cognitive neuroscience, 12 (1): pp. 48-55, 2000.
Brice A Kuhl, Jesse Rissman, and Anthony D Wagner. Multi-voxel patterns of visual category representation during episodic encoding are predictive of subsequent memory. Neuropsychologia, 50 (4): pp. 458-469, 2012.
G. R. Kuperberg, D. A. Kreher, T. Sitnikova, D. N. Caplan, and P. J. Holcomb. The role of animacy and thematic relationships in processing active english sentences: Evidence from event-related potentials. Brain and Language, 100 (3): pp. 223-237, 2007.
M. Kutas and S. A. Hillyard. Brain potentials during reading reflect word expectancy and semantic association. Nature, 307 (5947): pp. 161-163, 1984.
T. Landauer and S. Dumais. A solution to Plato's problem: the latent semantic analysis theory of acquisition, induction, and representation of knowledge. Psychological Review, 104: pp. 211-240, 1997.
Benjamin J Levy and Anthony D Wagner. Measuring memory reactivation with functional mri implications for psychological theory. Perspectives on Psychological Science, 8 (1): pp. 72-78, 2013.
I. Levy, U. Hasson, G. Avidan, T. Hendler, and R. Malach. Center-periphery organization of human object areas. Nature neuroscience, 4 (5): pp. 533-539, 2001.
R. Levy. Expectation-based syntactic comprehension. Cognition, 106 (3): pp. 1126-1177, 2008.
Jackson C Liang, Anthony D Wagner, and Alison R Preston. Content representation in the human medial temporal lobe. Cerebral Cortex Jan. 2013; 23: pp. 80-96, doi:10.1093/cercor/bhr379, (Advance Access publication Jan. 23, 2012).
T. Linzen., A. Marantz, and L. Pylkkänen. Syntactic context effects in visual word recognition: An MEG study, 2013, pp. 117-139.
Hugo Lövheim. A new three-dimensional model for emotions and monoamine neurotransmitters. Medical Hypotheses 78 (2012), pp. 341-348.
B. Z. Mahon and A. Caramazza. Concepts and categories: a cognitive neuropsychological perspective. Annual review of psychology, 2009 ; 60: pp. 27-51. doi:10.1146/annurev.psych.60.110707. 163532.
Markant, Doug, and Todd M. Gureckis. "Does the utility of information influence sampling behavior" In Proceedings of the 34th annual conference of the cognitive science society, pp. 719-724. 2012.
A. Martin. The representation of object concepts in the brain. Annual review of psychology, 58: pp. 25-45, 2007.
McDonnell, John V., Carol A. Jew, and Todd M. Gureckis. "Sparse category labels obstruct generalization of category membership." In Proceedings of the 34th annual conference of the cognitive science society, pp. 749-754. 2012.
Geoffrey McLachlan and David Peel. Finite mixture models, vol. 299. Wiley Interscience, 2000, Chapter 2.
G. A. Miller and C. Fellbaum. Semantic networks of english. Cognition, 41 (1): pp. 197-229, 1991.
Martin M Monti. Statistical analysis of fMRI time-series: A critical review of the GLM approach. Frontiers in Human Neuroscience, vol. 5, Article 28, 2011, pp. 1-13.
C. E. Osgood, G. J. Suci, and P. Tannenbaum. The measurement of meaning. University of Illinois Press, 1967, Chapter 1.
K. Pammer, P. C. Hansen, M. L. Kringelbach, I. Holliday, G. Barnes, A. Hillebrand, K. D. Singh, and P. L. Cornelissen. Visual word recognition: the first half second. NeuroImage, 22 (4): pp. 1819-1825, 2004.
A. Parbery-Clark, S. Anderson, E. Hittner, and N. Kraus. Musical experience strengthens the neural representation of sounds important for communication in middle-aged adults. Frontiers in aging neuroscience,vol. 4, Article 30, Nov. 2012, pp. 1-12.
K. Patterson, P. J. Nestor, and T. T. Rogers. Where do you know what you know? the representation of semantic knowledge in the human brain. Nature Reviews Neuroscience, 8 (12): pp. 976-987, 2007.
Francisco Pereira, Greg Detre, and Matthew Botvinick. Generating text from functional brain images. Frontiers in Human Neuroscience, vol. 5, Article 72, Aug. 2011, pp. 1-11.
Russell A Poldrack, Jeanette A Mumford, and Thomas E Nichols. Handbook of functional mri data analysis. Cambridge University Press, 2011, Appendix A, pp. 191-200.
F. Pulvermüller and O. Hauk. Category-specific conceptual processing of color and form in left fronto-temporal cortex. Cerebral Cortex, 16 (8): pp. 1193-1201, 2006.
L. Pylkkänen and B. McElree. An MEG study of silent meaning. Journal of Cognitive Neuroscience, 19 (11): pp. 1905-1921, 2007.
L. Pylkkänen, A. E. Martin, B. McElree, and A. Smart. The anterior midline field: Coercion or decision making? Brain and Language, 108 (3): pp. 184-190, 2009.
Liina Pylkkänen. Introducing arguments, vol. 49. MIT Press, 2008, Chapter 1.
Liina Pylkkänen, Rodolfo Llinás, and Gregory L Murphy. The representation of polysemy: MEG evidence. Journal of Cognitive Neuroscience, 18 (1): pp. 97-109, 2006.
Jesse Rissman, Henry T Greely, and Anthony D Wagner. Detecting individual memories through the neural decoding of memory states and past experience. Proceedings of the National Academy of Sciences, 107 (21): pp. 9849-9854, 2010.
D. C. Rubin. 51 properties of 125 words: A unit analysis of verbal behavior. Journal of Verbal Learning and Verbal Behavior, 19 (6): pp. 736-755, 1980.
James A Russell. A circumplex model of affect. Journal of personality and social psychology, 39 (6): pp. 1161-1178, 1980.
A. V. Samsonovich. A metric scale for 'abstractness' of the word meaning. In Workshops at the Twenty-Sixth AAAI Conference on Artificial Intelligence, 2012, pp. 48-52.

(56) References Cited

OTHER PUBLICATIONS

A. V. Samsonovich and G. A. Ascoli. A simple neural network model of the hippocampus suggesting its pathfinding role in episodic memory retrieval. Learn Mem, 12 (2): pp. 193-208, 2005. NIH R01 NS39600/NS/United States NINDS Journal Article Research Support, N.I.H., Extramural Research Support, U.S. Gov't, Non-P. H.S. Research Support, U.S. Gov't, P.H.S. United States.

A. V. Samsonovich and G. A. Ascoli. Advances in Artificial General Intelligence: Concepts, Architectures and Algorithms, chapter Cognitive Map Dimensions of the Human Value System Extracted from Natural Language, pp. 111-124. IOS Press, 2007.

A. V. Samsonovich and G. A. Ascoli. Computing semantics of preference with a semantic cognitive map of natural language: Application to mood sensing from text. In 2008 Multidisciplinary Workshop on Advances in Preference Handling, 2008, pp. 91-96.

A. V. Samsonovich and G. A. Ascoli. Principal semantic components of language and the measurement of meaning. PloS one, vol. 5, Issue 6: pp. e10921.1-e10921.17, Jun. 2010.

Samsonovich, Alexei V., and Colin P. Sherrill. "Comparative study of self-organizing semantic cognitive maps derived from natural language." In Proceedings of the 29th Annual Cognitive Science Society, p. 1848. Cognitive Science Society, 2007.

A.V. Samsonovich and G.A. Ascoli. Augmenting weak semantic cognitive maps with an 'abstractness' dimension. Computational Intelligence and Neuroscience, vol. 2013 (2013), Article ID 308176, pp. 1-10.

P. Schwenkreis, S. El Tom, P. Ragert, B. Pleger, M. Tegenthoff, and H. R. Dinse. Assessment of sensorimotor cortical representation asymmetries and motor skills in violin players. European Journal of Neuroscience, 26 (11): pp. 3291-3302, 2007.

93. R. Sebastian, A. R. Laird, and S. Kiran. Meta-analysis of the neural representation of first language and second language. Applied Psycholinguistics 32 (2011), pp. 799-819.

ML Seghier, F Kherif F, G Josse, and CJ Prince. Regional and hemispheric determinants of language laterality: Implications for preoperative fMRI. Huma Brain Mapping, 32: pp. 1602-1614, 2011.

K. A. Shapiro, F. M. Mottaghy, N. O. Schiller, T. D. Poeppel, M. O. Flüß, H-W Müller, A. Caramazza, and B. J. Krause. Dissociating neural correlates for nouns and verbs. Neuroimage, 24 (4): pp. 1058-1067, 2005.

Svetlana V Shinkareva, Robert A Mason, Vicente L Malave, Wei Wang, Tom M Mitchell, and Marcel Adam Just. Using fmri brain activation to identify cognitive states associated with perception of tools and dwellings. PLoS One,Jan. 2008, Issue 1, e1394, pp. 1-9.

Svetlana V Shinkareva, Vincente L Malave, Robert A Mason, Tom M Mitchell, and Marcel Adam Just. Commonality of neural representations of words and pictures. Neuroimage, 54: pp. 2418-2425, 2011.

Svetlana V Shinkareva, Vicente L Malave, Marcel Adam Just, and Tom M Mitchell. Exploring commonalities across participants in the neural representation of objects. Human Brain Maping, 33: pp. 1375-1383, 2012.

W. K. Simmons, V. Ramjee, M. S. Beauchamp, K McRae, A. Martin, and L. W. Barsalou. A common neural substrate for perceiving and knowing about color. Neuropsychologia, 45 (12): pp. 2802-2810, 2007.

Olaf Sporns. Network attributes for segregation and integration in the human brain. Current Opinion in Neurobiology 2013, 23: pp. 162-171.

E. Vul, D. Lashkari, P. J. Hsieh, P. Golland, and N. Kanwisher. Data-driven functional clustering reveals dominance of face, place, and body selectivity in the ventral visual pathway. Journal of Neurophysiology, 108 (8): pp. 2306-2322, Oct. 2012.

Edward Vul, Christine Harris, Piotr Winkielman, and Harold Pashler. Puzzlingly high correlations in fmri studies of emotion, personality, and social cognition. Perspectives on Psychological Science, 4 (3): pp. 274-290, 2009.

Huth, A. G., Nishimoto, S., Vu, A. T., & Gallant, J. K. (2012). A continuous semantic space describes the representation of thousands of object and action categories across the human brain. Neuron, 76(6), pp. 1210-1224.

Mitchell, T. M., Shinkareva, S. V., Carlson, A., Chang, K.-M., Malave, V. L., Mason, R. A., & Just, M. A. (2008). Predicting human brain activity associated with the meanings of nouns. Science, 320(5880), pp. 1191-1195.

G. Romano C. Carpineto. Concept Data Analysis: Theory and Applications. Wiley, Chapter 2, 2004.

Richard O. Duda, Peter E. Hart, and David G. Stork. Pattern Classification. Wiley-Interscience, 2nd edition, Chapter 4, Section 3, 2001.

B. Ganter and R. Wille. Formal Concept Analysis: Mathematical Foundations. Springer-Verlag, Chapter 1, 1998.

M. Swain, S. K. Dash, S. Dash, and A. Mohapatra. An approach for IRIS plant classification using neural network. International Journal of Soft Computing, 2012, p. 79-89.

Bache and M. Lichman. UCI machine learning repository. University of California, Irvine, School of Information and Computer Sciences, 2013, available at h t p : / / archive.ics.uci.edu/ml/datasets/ Iris taken on Jul. 17, 2015.

Notification of Transmittal of International Search Report and the Written Opinion of the International Searching Authority for PCT/US2016/031644; dated Aug. 19, 2016.

International Search Report of the International Searching Authority for PCT/US2016/031644; dated Aug. 19, 2016.

The Written Opinion of the International Searching Authority for PCT/US2016/031644; dated Aug. 19, 2016.

Nida Meddouri et al., 'Classification Methods Based on Formal Concept Analysis', In: CLA 2008 (Posters), Oct. 2008, pp. 9-16, <URL: https://www.researchgate.net/publication/262684876_Classification_Methods_based_on_Formal_Concept_Analysis>.

K. Bache and M. Lichman. UCI machine learning repository. University of California, Irvine, School of Information and Computer Sciences, 2013, available at h t p : / / archive.ics.uci.edu/ml/datasets/Iris taken on May 5, 2015.

G. Romano C. Carpineto. Concept Data Analysis: Theory and Applications. Wiley, 2004, Chapter 2.

Stephanie Guillas, Karell Bertet, and Jean-Marc Ogier. A generic description of the concept lattices' classifier: application to symbol recognition. In GREC: IAPR International Workshop on Graphics Recognition, 2005, pp. 47-60.

Stephanie Guillas, Karell Bertet, and Jean-Marc Ogier. Concept lattice classifier: a first step towards an iterative process of recognition of noised graphic objects. In CLA: Concept Lattices and Their Applications, No. section 2, pp. 257-263, 2006.

Olga Prokasheva, Alina Onishchenko, and Sergey Gurov. Classification Methods Based on Formal Concept Analysis. In FDAIR: Formal Concept Analysis Meets Information Retrieval, pp. 95-104, 2013.

M. Swain, S. K. Dash, S. Dash, and A. Mohapatra. An approach for IRIS plant classification using neural network. International Journal of Soft Computing, 2012, pp. 79-89.

International Search Report of the International Searching Authority for PCT/US2015/041744; dated May 25, 2016.

The Written Opinion of the International Searching Authority for PCT/US2015/041744; dated May 25, 2016.

Notification of Transmittal of International Search Report and the Written Opinion of the International Searching Authority for PCT/US2015/041744; dated May 25, 2016.

Olga Prokasheva et al., 'Classification Methods Based on Formal Concept Analysis', In: Workshop co-located with the 35th European Conference on Information Retrieval (ECIR 2013), Mar. 24, 2013, pp. 95-103.

Preliminary Amendment for U.S. Appl. No. 14/807,083, dated Sep. 2, 2016.

Basri, Ronen, and David W. Jacobs, "Lambertian reflectance and linear subspaces," Pattern Analysis and Machine Intelligence, IEEE Transactions on 25.2, pp. 218-233, 2003.

Kohavi, Ron, "A study of cross-validation and bootstrap for accuracy estimation and model selection," IJCAI. vol. 14. No. 2, 1995.

(56) References Cited

OTHER PUBLICATIONS

Cortes, Corinna, and Vladimir Vapnik, "Support-vector networks," Machine learning 20.3, pp. 273-297, 1995.
E. Candes, X. Li, Y. Ma, and J. Wright, "Robust Principal Component Analysis?" IEEE PAMI 2011, pp. 201-204.
S. J. Gilbert. "Decoding the content of delayed intentions," J Neurosci, 31, pp. 2888-2894, 2011.
T. M. Mitchell, S. V. Shinkareva, A. Carlson, K-M. Chang, V. L. Malave, R. A. Mason and M. A. Just, "Predicting human brain activity associated with the meanings of nouns," Science, 320(5880), pp. 1191-1195, 2008.
J. Mourao-Miranda, A. L. Bokde, C. Born, H. Hampel, and M. Stetter, "Classifying brain states and determining the discriminating activation patterns: support vector machine on functional MRI data," Neuroimage 28, pp. 980-995 (2005).
T. Zhou and D. Tao. "GoDec: Randomized low-rank & sparse matrix decomposition in noisy case," ICML 2011.
Y. C. Pati, R. Rezaiifar, and P. S. Krishnaprasad, "Orthogonal matching pursuit: recursive function approximation with applications to wavelet decomposition," Proceedings of 27th Asilomar Conference on Signals, Systems and Computers, 1, 1993, pp. 40-44.
D. Needell and J A Tropp, "Cosamp: iterative signal recovery from incomplete and inaccurate samples," In Information Theory and Applications, pp. 1-25, 2008.
David L Donoho, Yaakov Tsaig, Iddo Drori, and Jean-luc Starck, "Sparse Solution of Underdetermined Linear Equations by Stagewise Orthogonal Matching Pursuit" (Mar.): pp. 1-39, 2006.
Roman Vershynin and Deanna Needell, "Uniform uncertainty principle and signal recovery via regularized orthogonal matching pursuit," arXiv, pp. 1-18, (2008).
Qiang Zhang and Baoxin Li, " Discriminative K-SVD for Dictionary Learning in Face Recognition," IEEE Computer Society Conference on Computer Vision and Pattern Recognition, pp. 2691-2698, Jun. 2010.
Kendrick N. Kay, Ariel Rokem, Jonathan Winawer, Robert F. Dougherty, and Brian A. Wandell, "GLMdenoise: a fast, automated technique for denoising task-based fMRI data," Frontiers in Neuroscience, 7(Dec.), pp. 1-15, Jan. 2013.
Chih-Chung Chang and Chih-Jen Lin, "LIBSVM: A Library for Support Vector Machines," ACM Transactions on Intelligent Systems and Technology, 2(3), pp. 27:1-27:27, 2011.
Shinji Nishimoto, An T. Vu, Thomas Naselaris, Yuval Benjamini, Bin Yu, and Jack L. Gallant, "Reconstructing Visual Experiences from Brain Activity Evoked by Natural Movies," Current Biology, 21(19), pp. 1641-1646, Oct. 2011.
Tom Goldstein and Simon Setzer, "High-order methods for basis pursuit," Technical report, UCLA CAM, 2010, pp. 1-17.
Tom Goldstein and Stanley Osher, "The Split Bregman Method for L1-Regularized Problems," SIAM Journal on Imaging Sciences, 2(2), pp. 323-343, Jan. 2009.
Michal Aharon, Michael Elad, and Alfred Bruckstein, " K-SVD: An Algorithm for Designing Overcomplete Dictionaries for Sparse Representation," IEEE Transactions on Signal Processing, 54(11), pp. 4311-4322, 2006.
Ron Rubinstein, Michael Zibulevsky, and Michael Elad, "Efficient Implementation of the K-SVD Algorithm using Batch Orthogonal Matching Pursuit," Technical report, CS Technion, 2008, pp. 1-15.
Notice of Allowance for U.S. Appl. No. 14/978,814, dated Sep. 11, 2019.
Mitchell, et al., "Predicting human brain activity associated with the meanings of nouns," Science, vol. 320, pp. 1191-1195. (Year: 2008).
Office Action 1 for U.S. Appl. No. 14/626,915, dated May 7, 2018.
Interview Summary for U.S. Appl. No. 14/626,915, dated Jun. 25, 2018.
Response to Interview Summary for U.S. Appl. No. 14/626,915, dated Jul. 24, 2018.
Notice of Allowance for U.S. Appl. No. 14/626,915, dated Sep. 6, 2018.
Notification Concerning Transmittal of International Preliminary Report on Patentability for PCT/US2016/031644, dated Feb. 1, 2018.
International Preliminary Report on Patentability for PCT/US2016/031644, dated Feb. 1, 2018.
Bache and M. Lichman. UCI machine learning repository. University of California, Irvine, School of Information and Computer Sciences, 2013, available at h t p : / / archive.ics.uci.edu/ml/datasets/Iris taken on Jul. 17, 2015, pp. 1-8.
Office Action 1 for U.S. Appl. No. 15/150,998, dated Aug. 2, 2017.
"Understanding the semantic structure of human fMRI brain recording with formal concept analysis," Endres, Dominik, et al. Formal Concept Analysis (2012), pp. 96-111.
"Input feature selection by mutual information based on Parzen window," Nojun Kwak, Chong-Ho Choi, IEEE Transactions on Pattern Analysis and Machine Intelligence, vol. 24, Issue 12, Dec. 2002, pp. 1667-1671.
"Feature ranking methods based on information entropy with parzen windows," Biesiada, Jacek, et al. International Conference on Research in Electrotechnology and Applied Informatics. Aug. 31-Sep. 3, 2005, vol. 1, 9 pages.
"An application of formal concept analysis to semantic neural decoding," Endres, Dominik Maria, et al., Annals of Mathematics and Artificial Intelligence. Dec. 2009, vol. 57, Issue 3-4, pp. 233-248.
"Confidence Intervals for the Area under ROC Curve," Cortes, Corinna, and Mahryar Mohri. Advances in neural information processing systems. 2005, 8 pages.
Response to Office Action 1 for U.S. Appl. No. 15/150,998, dated Nov. 2, 2017.
Office Action 2 for U.S. Appl. No. 15/150,998, dated Jan. 11, 2018.
"Noise Reduction in BOLD-Based fMRI Using Component Analysis," Christopher G. Thomas, et al., NeuroImage, vol. 17, Issue 3, Nov. 2002, pp. 1521-1537.
Response to Office Action 2 for U.S. Appl. No. 15/150,998, dated Apr. 9, 2018.
Office Action 3 for U.S. Appl. No. 15/150,998, dated Sep. 7, 2018.
Communication pursuant to Rules 161(2) and 162 EPC for European Regional Phase Patent Application No. 16828171.5, dated Mar. 2, 2018.
A Response for European Regional Phase Patent Application No. 16828171.5, dated Sep. 12, 2018.
Communication pursuant to Rules 70(2) and 70a(2) EPC; European Search Report comprising the supplementary European Search Report and non-binding European Search Opinion for the application for European Regional Phase Patent Application No. 16828171.5, dated Mar. 12, 2019.
"Computing the concept lattice using Dendritical Neural Networks," David Ernesto Caro-Contreras, et al., Jun. 5, 2013, CLA 2013, Proceedings of the Tenth International Conference on Concept Lattices and Their Applications, pp. 1-12.
"Concept lattices: a tool for primitives selection?," Stephanie Guillas, et al., Jan. 1, 2005, XP055556117, France, URL:http://documents.irevues.inist.fr/bitstreamjhandlej2042/4397j08-Guillas%20et%20a1%20couleur.pdf?sequence=1,Downloaded Dec. 23, 2019.
Extended supplementary European Search Report comprising of the supplementary European Search Report and non-binding European Search Opinion for European Regional Phase Patent Application No. 15841555.4, dated Mar. 13, 2018.
Zhipeng Xie et al: "Concept lattice based 1-20 composite classifiers for high predictability", Journal of Experimental and Theoretical Artificialintelligence, vol. 14, No. 2-3, Apr. 1, 2002 (Apr. 1, 2002), pp. 143-156.
Kaburlasos Vassilis G et al: "FCknn: A granular knn classifier based on formal concepts", 2014 IEEE International Conference on Fuzzy Systems (FUZZ-IEEE), Jul. 6, 2014 (Jul. 6, 2014), pp. 61-68.
Van Erp M et al: An overview and 1-28 comparison of voting methods for pattern recognition 11, Frontiers in Handwriting Recognition, 2002. Proceedings. Eighth Intern Ational Workshop on Aug. 6-8, 2882, Piscataway, NJ, USA,IEEE, Aug. 6, 2802 (2802-88-86), pp. 195-208.

(56) References Cited

OTHER PUBLICATIONS

Response to the Opinion accompanying the extended supplementary European search report for European Regional Phase Patent Application No. 15841555.4, dated Jan. 11, 2019.
Notification Concerning Transmittal of International Preliminary Report on Patentability for PCT/US2015/041744; dated Feb. 2, 2017.
International Preliminary Report on Patentability for PCT/US2015/041744; dated Feb. 2, 2017.
First Office Action for Chinese Patent Application No. 201580039768.2, dated Sep. 4, 2018.
English translation of the First Office Action for Chinese Patent Application No. 201580039768.2, dated Sep. 4, 2018.
Zhipeng Xie, et al., "Concept lattice based composite classifiers for high predictability," Journal of Experimental and Theoretical Artificial Intelligence, 2002, pp. 143-156.
Response to the First Office Action for Chinese Patent Application No. 201580039768.2, dated Jan. 17, 2019.
English translation of the amended claims for the Response to the First Office Action for Chinese Patent Application No. 201580039768.2, dated Jan. 17, 2019.
Notice of Allowance for Chinese Patent Application No. 201580039768.2, dated Jun. 5, 2019.
Office Action 1 for U.S. Appl. No. 14/807,083, dated Apr. 9, 2018.
Response to Office Action 1 for U.S. Appl. No. 14/807,083, dated Jun. 25, 2018.
Office Action 2 for U.S. Appl. No. 14/807,083, dated Nov. 16, 2018.
Response to Office Action 2 for U.S. Appl. No. 14/807,083, dated Feb. 19, 2019.
Notice of Allowance for U.S. Appl. No. 14/807,083, dated Mar. 13, 2019.
Office Action 1 for U.S. Appl. No. 14/869,908, dated Aug. 13, 2018.
M. Ranzato, et al., "Sparse Feature Learning for Deep Belief Networks," Advances in Neural Processing Systems 20 (NIPS 2007) 8 pp. (Year: 2007).
Matlab online documentation, "Supervised Learning (Machine Learning) Workflow and Algorithms," <https://www.mathworks.com/help/stats/supervised-learning-machine-learning-workflow-and-algorithms.html> verified online as of at least 2013 by the Internet Archive web.archive.org, 4 pp. (Year: 2013).
Office Action 1 Response for U.S. Appl. No. 14/869,908, dated Nov. 27, 2018.
Office Action 2 for U.S. Appl. No. 14/869,908, dated Dec. 18, 2018.

* cited by examiner

SYSTEM FOR MAPPING EXTRACTED NEURAL ACTIVITY INTO NEUROCEPTUAL GRAPHS

CROSS-REFERENCE TO RELATED APPLICATIONS

This is a Continuation-in-Part application of U.S. application Ser. No. 14/489,313, filed in the United States on Sep. 17, 2014, entitled, "Mapping Across Domains to Extract Conceptual Knowledge Representation from Neural Systems," which is a Non-Provisional patent application of U.S. Provisional Application No. 62/028,083, filed in the United States on Jul. 23, 2014, entitled, "Mapping Across Domains to Extract Conceptual Knowledge Representation from Neural Systems," which are incorporated herein by reference in their entirety.

This is ALSO a Continuation-in-Part application of U.S. application Ser. No. 14/978,814, filed in the United States on Dec. 22, 2015, entitled, "Method and System to Predict and Interpret Conceptual Knowledge in the Brain," which is a Non-Provisional patent application of U.S. Provisional Application No. 62/095,574, filed in the United States on Dec. 22, 2014, entitled, "Method and System to Predict and Interpret Conceptual Knowledge in the Brain," the entirety of which are hereby incorporated by reference as though fully set forth herein. U.S. application Ser. No. 14/978,814 is a Continuation-in-Part application of U.S. Non-Provisional application Ser. No. 14/489,313, filed in the United States on Sep. 17, 2014, entitled, "Mapping Across Domains to Extract Conceptual Knowledge Representation from Neural Systems," which is a Non-Provisional patent application of U.S. Provisional Application No. 62/028,083, filed in the United States on Jul. 23, 2014, entitled, "Mapping Across Domains to Extract Conceptual Knowledge Representation from Neural Systems," which are incorporated herein by reference in their entirety. U.S. application Ser. No. 14/978, 814 is ALSO a Continuation-in-Part application of U.S. Non-Provisional application Ser. No. 14/807,083, filed in the United States on Jul. 23, 2015, entitled, "A General Formal Concept Analysis (FCA) Framework for Classification," which is a Continuation-in-Part Application of U.S. Non-Provisional application Ser. No. 14/489,313, filed in the United States on Sep. 17, 2014, entitled, "Mapping Across Domains to Extract Conceptual Knowledge Representation from Neural Systems," which are incorporated herein by reference in their entirety. U.S. Non-Provisional application Ser. No. 14/807,083 is also a Non-Provisional Application of U.S. Provisional Application No. 62/028,171, filed in the United States on Jul. 23, 2014, entitled, "A General Formal Concept Analysis (FCA) Framework for Classification," which is incorporated herein by reference in its entirety.

This is ALSO a Continuation-in-Part application of U.S. application Ser. No. 15/150,998, filed in the United States on May 10, 2016, entitled, "A Parzen Window Feature Selection Algorithm for Formal Concept Analysis (FCA)," which is a Non-Provisional patent application of U.S. Provisional Application No. 62/195,876, filed in the United States on Jul. 23, 2015, entitled, "A Parzen Window Feature Selection Algorithm for Formal Concept Analysis (FCA)," which are incorporated herein by reference in its entirety. U.S. application Ser. No. 15/150,998 is ALSO a Continuation-in-Part application of U.S. Non-Provisional application Ser. No. 14/489,313, filed in the United States on Sep. 17, 2014, entitled, "Mapping Across Domains to Extract Conceptual Knowledge Representation from Neural Systems," which is a Non-Provisional patent application of US Provisional Application No. 62/028,083, filed in the United States on Jul. 23, 2014, entitled, "Mapping Across Domains to Extract Conceptual Knowledge Representation from Neural Systems," which are incorporated herein by reference in their entirety. U.S. application Ser. No. 15/150,998 is ALSO a Continuation-in-Part application of U.S. Non-Provisional application Ser. No. 14/807,083, filed in the United States on Jul. 23, 2015, entitled, "A General Formal Concept Analysis (FCA) Framework for Classification, which is a Continuation-in-Part application of U.S. Non-Provisional application Ser. No. 14/489,313, filed in the United States on Sep. 17, 2014, entitled, "Mapping Across Domains to Extract Conceptual Knowledge Representation from Neural Systems," which are incorporated herein by reference in their entirety. U.S. Non-Provisional application Ser. No. 14/807,083 is ALSO a Non-Provisional Application of U.S. Provisional Application No. 62/028,171, filed in the United States on Jul. 23, 2014, entitled, "A General Formal Concept Analysis (FCA) Framework for Classification," which is incorporated herein by reference in its entirety.

This is ALSO a Continuation-in-Part Application of U.S. application Ser. No. 14/807,083, filed in the United States on Jul. 23, 2015, entitled, "A General Format Concept Analysis (FCA) Framework for Classification," which is a Non-Provisional Application of U.S. Provisional Application No. 62/028,171, filed in the United States on Jul. 23, 2014, entitled, "A General Formal Concept Analysis (FCA) Framework for Classification," which are incorporated herein by reference in their entirety. U.S. application Ser. No. 14/807,083 is a Continuation-in-Part Application of U.S. Non-Provisional application Ser. No. 14/489,313, filed in the United States on Sep. 17, 2014, entitled, "Mapping Across Domains to Extract Conceptual Knowledge Representation from Neural Systems," which is incorporated herein by reference in its entirety.

This is ALSO a Continuation-in-Part Application of U.S. application Ser. No. 14/869,907, filed in the United States on Sep. 29, 2015, entitled, "Sparse Feature Learning," which is a Non-Provisional patent application of U.S. Application No. 62/057,707, filed in the United States on Sep. 30, 2014, entitled, "Sparse Atomic Feature Learning via Gradient Regularization," which are incorporated herein by reference in their entirety.

This is ALSO a Continuation-in-Part Application of U.S. application Ser. No. 14/626,915, filed in the United States on Feb. 19, 2015, entitled, "Feature Transformation of Neural Activity with Sparse and Low-Rank (SLR) Decomposition)," which is incorporated herein by reference in its entirety.

This is ALSO a Non-Provisional Application of U.S. Application No. 62/246,515, filed in the United States on Oct. 26, 2015, entitled "KRNS-MEANING System," which is incorporated herein by reference in its entirety.

GOVERNMENT LICENSE RIGHTS

This invention was made with government support under U.S. Government Contract Number FA8650-13-C-7356. The government has certain rights in the invention.

BACKGROUND OF INVENTION

(1) Field of Invention

The present invention relates to a system for neural decoding and, more particularly, to a system for neural decoding that utilizes behavioral, neuroimaging, and semantic data.

(2) Description of Related Art

The ability to decode neural signals can be used to learn and represent the mapping between neural data from individuals or groups and other data sources. These other data sources can be semantic data, or visual data as described in Literature Reference No. 1 of the List of Incorporated Literature References). Previous systems for neural decoding have not been utilized on multiple large data sets (see the List of Incorporated Literature References, Literature Reference Nos. 1 and 2) and cannot be used on multiple modes of data.

Thus, a continuing need exists for a system for neural decoding that is comprehensive and flexible with the ability to use multimodal data.

SUMMARY OF INVENTION

The present invention relates to a system for neural decoding and, more particularly, to a system for neural decoding that utilizes behavioral, neuroimaging, and semantic data. The system comprises one or more processors and a memory having instructions such that when the instructions are executed, the one or more processors perform multiple operations. A subset of neural data is selected that is correlated with a set of behavioral data. Using at least one neural feature extraction method, the subset of neural data is transformed into sparse neural representations. A set of semantic features fare extracted from a set of semantic data. Using a combination of distinct classification modes, the set of semantic data is mapped to the sparse neural representations. Finally, new input neural data is decoded.

In another aspect, a plurality of neural feature extraction methods are used serially.

In another aspect, the distinct classification modes are trained with the set of behavioral data, the set of semantic data, and the sparse neural representations. In a first classification mode, a transformation is learned between the set of semantic data and the sparse neutral representations. In a second classification mode, neuroceptual lattice classification is performed.

In another aspect, a ranked list of words are generated from new input neural data using the trained classification modes.

In another aspect, in selecting a subset of neural data, the system sorts voxels from a set of neural data by stability, and selects a subset of voxels determined to be most stable. In addition, a subset of voxels from the set of neural data is identified that is correlated with a feature subset in the set of behavioral data using sparse canonical correlation analysis (SCCA).

In another aspect, in the first classification mode, a linear support vector machine (SVM) is used to generate a SVM matrix of rows and columns, wherein each row in the SVM matrix represents unknown sparse neural representations and each column represents a probability of that sparse neural representation being present in the set of semantic data. The SVM matrix is transformed into a semantic-based matrix, wherein for each word in the set of semantic data, its ontological attributes are determined and indexed into columns to generate the semantic-based matrix. The columns of the semantic-based matrix are averaged to produce a value representing how likely the word is in the unknown sparse neural representations. A ranking matrix comprising values representing a plurality of words in the set of semantic data is generated.

In another aspect, the new input neural data is neural activity of a driver of a vehicle, wherein neural decoding of the driver's neural activity is used to control at least one component of the vehicle.

In another aspect, the neural data includes functional magnetic resonance imaging (fMRI) data.

As can be appreciated by one skilled in the art, in another aspect, the present invention also comprises a method for causing a processor to perform the operations described herein.

Finally, in another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
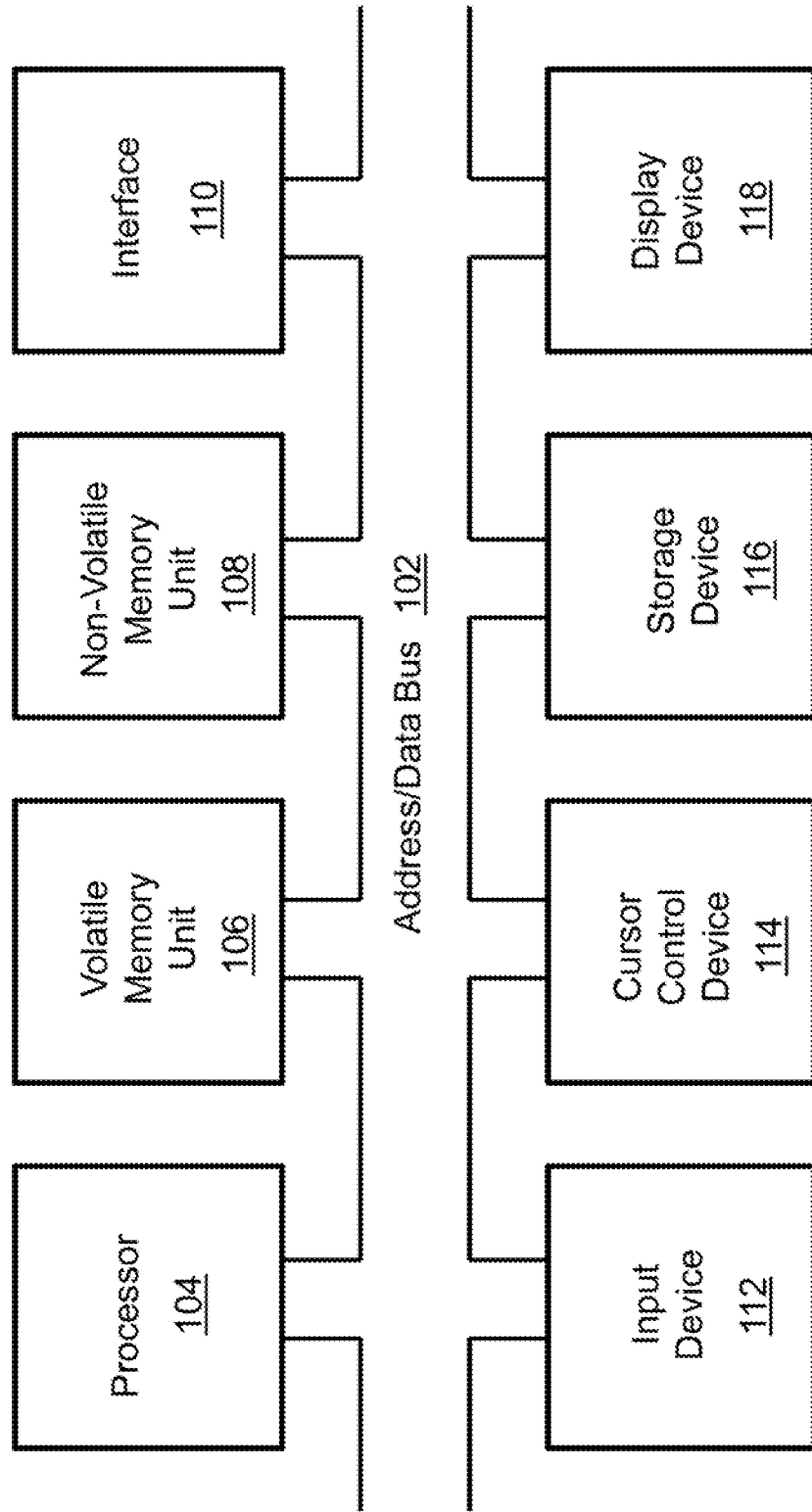
FIG. 1 is a block diagram depicting the components of a system for neural decoding according to some embodiments of the present disclosure.

The present invention relates to a system for neural decoding and, more particularly, to a system for neural decoding that utilizes behavioral, neuroimaging, and semantic data. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number as follows:

1. Huth, A. G., Nishimoto, S., Vu, A. T., & Gallant, J. K. (2012). A continuous semantic space describes the representation of thousands of object and action categories across the human brain. Neuron, 76(6), 1210-1224.
2. Mitchell, T. M., Shinkareva, S. V., Carlson, A., Chang, K.-M., Malave, V. L., Mason, R. A., & Just, M. A. (2008). Predicting human brain activity associated with the meanings of nouns. Science, 320(5880), 1191-1195.

(2) Principal Aspects

Various embodiments of the invention include three "principal" aspects. The first is a system for neural decoding. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
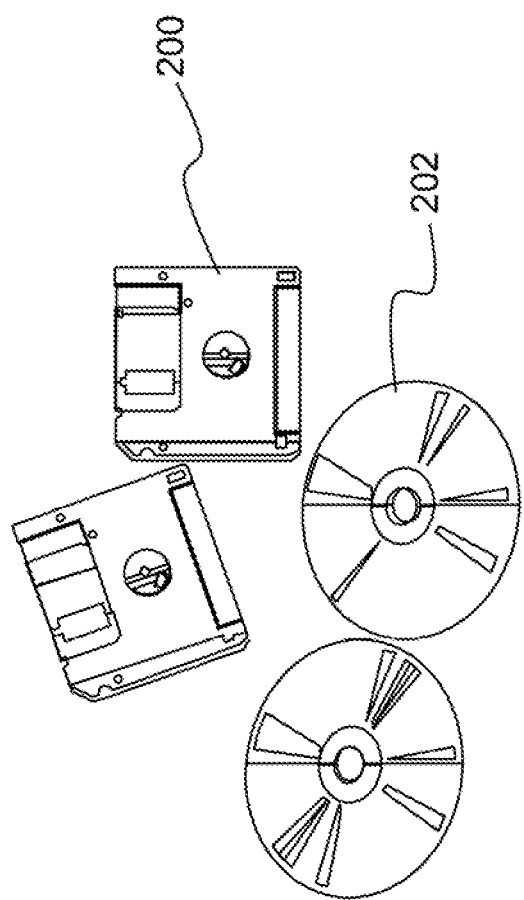
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Described is a system that utilizes behavioral, neuroimaging, and semantic data to perform interpretation, also known as neural decoding. This system is built with multiple modes to facilitate the investigation of neurosemantic features, ontological features, and semantic feature vectors in neural data. Additionally, sparse neural features are a primary building block in all modes of the system and are discovered using a combination of new machine learning methods from both behavioral and neuroimaging data.

U.S. application Ser. No. 14/978,814, which is hereby incorporated by reference as though fully set forth herein, describes the discovery of structured representation from multiple data domains (e.g., neural data and semantic data domains). The system according to various embodiments of the present disclosure adds additional neural feature extraction methods and data transformation methods to U.S. application Ser. No. 14/978,814. Compared to the state-of-the-art, the system described herein is more comprehensive and flexible than other systems for neural decoding of new input data, because the system is capable of both finding hierarchical structure from data domains using lattices (e.g., neural and semantic data in the neuroceptual lattice) as well as direct transformation between data domains (e.g., support vector machine (SVM) transformations to decode neural data into semantic features). This system has been utilized on multiple data sets from different human subjects that are much larger than data sets used in other works, such as Literature References Nos. 1 and 2. In addition, the system described herein provides improvements on the state-of-the-art for neural feature extraction. Finally, the system also incorporates the use of multimodal data; in particular, behavioral data, for feature selection. Although other systems may utilize behavioral data for classification, the system according to embodiments of the present disclosure is designed to gain the benefit of using behavioral data in the training stage, but not requiring its collection during interpretation (i.e., testing).

The system described herein incorporates subject matter from U.S. application Ser. Nos. 14/489,313, 14/978,814, 15/150,998, 14/807,083, 14/869,907, and 14/626,915, all of which are incorporated by reference as though fully set forth herein. In particular, U.S. application Ser. Nos. 14/489,313 and 14/978,814 describe a system built to represent neural data and data from another domain (e.g., semantic) as lattices to build a neuroceptual lattice. U.S. application Ser. Nos. 15/150,998 and 14/807,083 disclose methods for learning attributes for the lattice and for performing classification with a lattice. The system according to embodiments of the present disclosure also incorporates elements for neural feature extraction from U.S. application Ser. Nos. 14/869,907 and 14/626,915.

(4) Specific Details of Various Embodiments

Figure 3:
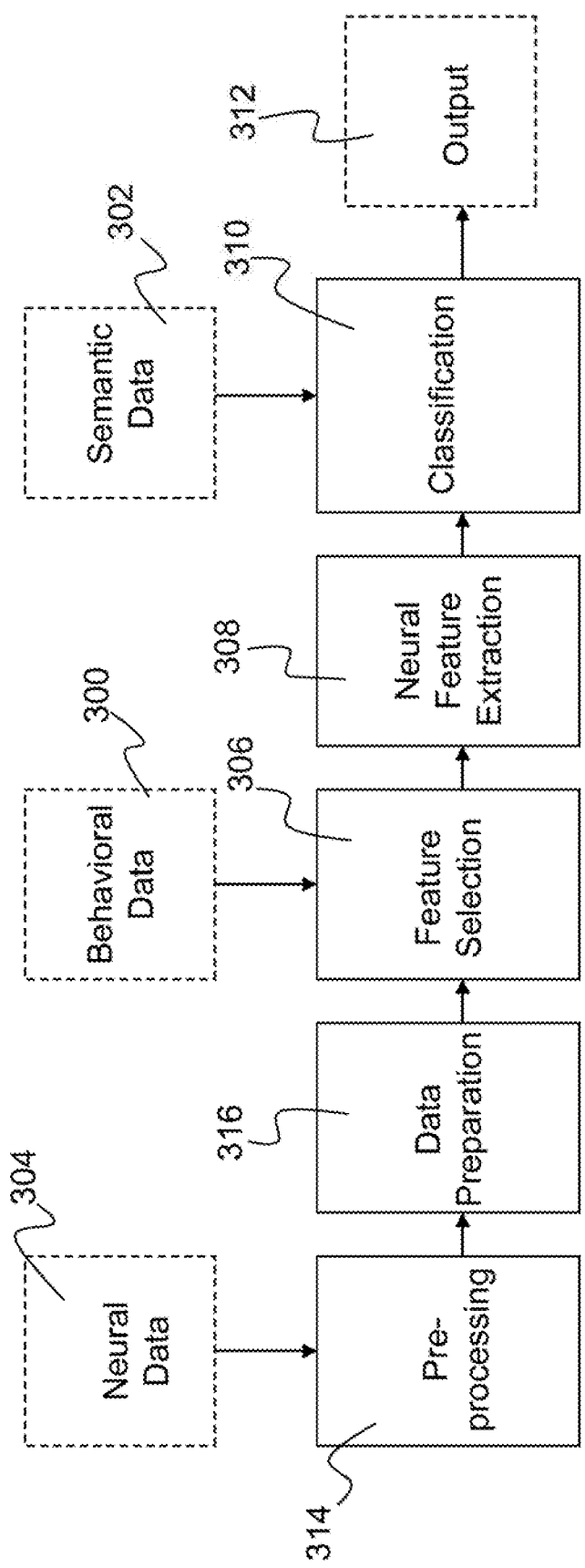
FIG. 3 is a flow diagram illustrating stages of data processing in the neural data pipeline, and the conceptual outputs for both neural and semantic data according to some embodiments of the present disclosure.

The system according to embodiments of the present disclosure utilizes behavioral, neuroimaging, and semantic data to perform interpretation (also known as neural decoding) of new input data. As will be described in further detail below (and depicted in FIG. 3), in its approach to interpretation, the system bridges behavioral data 300 from subjects, semantic data 302 in the form of ontologies or semantic feature vectors, and neuroimaging data (neural data 304) from experiments designed to learn representations for neurosemantic features for single concepts. The invention also incorporates transformation (see FIG. 6) as a new mode of data representation into the system apart from a neuroceptual lattice. In essence, data from one domain is transformed into another by learning the transformation using some machine learning method (e.g., support vector machines).

In one embodiment, behavioral data 300 has been used for feature selection 306 of voxels from an fMRI (functional magnetic resonance imaging) data set during interpretation. When applied to the feature selection 306 and dimensionality reduction problems of fMRI data sets, Sparse Canonical Correlation Analysis (SCCA) identifies the subset of voxels that are most highly correlated with a feature subset from a corresponding multidimensional data set.

In experimental studies, the system described herein utilized neurosemantic feature ratings as behavioral data 300 to perform SCCA with the neuroimaging data (neural data 304). The advantage here is that in mapping the reduced behavioral features to the fMRI volumes, SCCA projects both data sets onto a common feature space in order to determine the semantics of the underlying voxel activation to behavioral feature model and imposes a sparsity constraint for data compression. In essence, it is a method that finds the strongest connections between behavioral data 300 and neural data 304 to sub-select the neural data for subsequent processing stages (neural feature extraction 308 and classification 310).

The neural feature extraction 308 stage in the system according to embodiments of the present disclosure is used to learn sparse representations that effectively compresses the available signal in the data. This stage also acts to discard noise and decrease the amount of memory needed by the system. Additionally, sparse representations pose an advantage for classification 310 in machine learning as they generally have higher separability. The SAFL (Sparse Atomic Feature Learning) algorithm learns a dictionary, which forms a kind of neural basis set that is highly compressed (as described in U.S. application Ser. No. 14/869,907). Another mode the system uses for the discovery of sparse neural features is SLR (as described in U.S. application Ser. No. 14/626,915). During classification 310, a classifier is used to map between these sparse neural representations generated by neural feature extraction 308 and semantic data 302. The output 312 from the classifiers also produces probabilities, which can be used to rank the output 312.

Furthermore, the system described herein incorporates two very different classification 310 modes: the neuroceptual lattice mode and transformation mode. The same semantic data 302, behavioral data 300, and data from neural feature extraction 308 can be used to train either mode. This allows the same data to be represented in different ways inherent to the different modes, which have different advantages. For instance, the neuroceptual lattice mode has advantages in representing the hierarchy in the data, further described in U.S. application Ser. Nos. 14/489,313 and 14/978,814. The transformation mode has advantages of representing the multivariate nature of the data to increase its separability through learned weights, such as through using a support vector machine (SVM). A SVM is a discriminative classifier known to those skilled in the art. Both modes have been tested in experimental studies for interpretation (i.e., decoding of neural activity) with real behavioral data 300, semantic data 302, and neural data 304.

In an embodiment, the system provides as an output 312 a ranking of words or concepts from novel/new input neural activity after it has been trained. Given a user's neural activity (neural data 304), as captured by fMRI, fNIRS, or another imaging technique, the system predicts a ranking of words or concepts (output 312) that represent what the user is thinking; effectively decoding the user's neural activity. In other words, the neural data 304 is acquired from some imaging device and interpreted as a set of voxels with activity levels representing the brain's activity. The decoded output 312 is a set of ranked words/concepts that represent predictions of what the user is thinking.

Figure 7A:
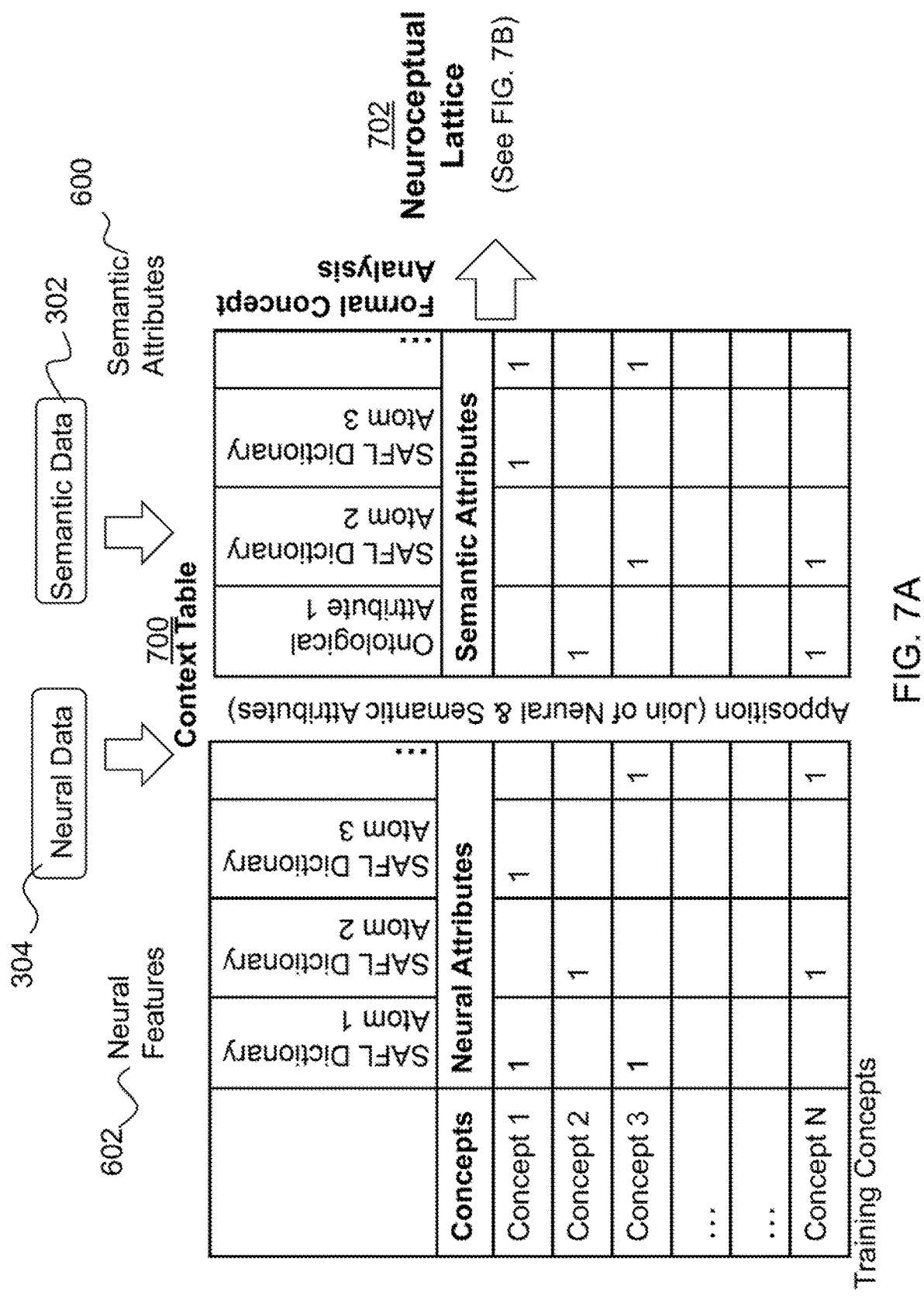
FIG. 7A is an illustration of context tables generated from neural and semantic data according to some embodiments of the present disclosure.
Figure 7B:
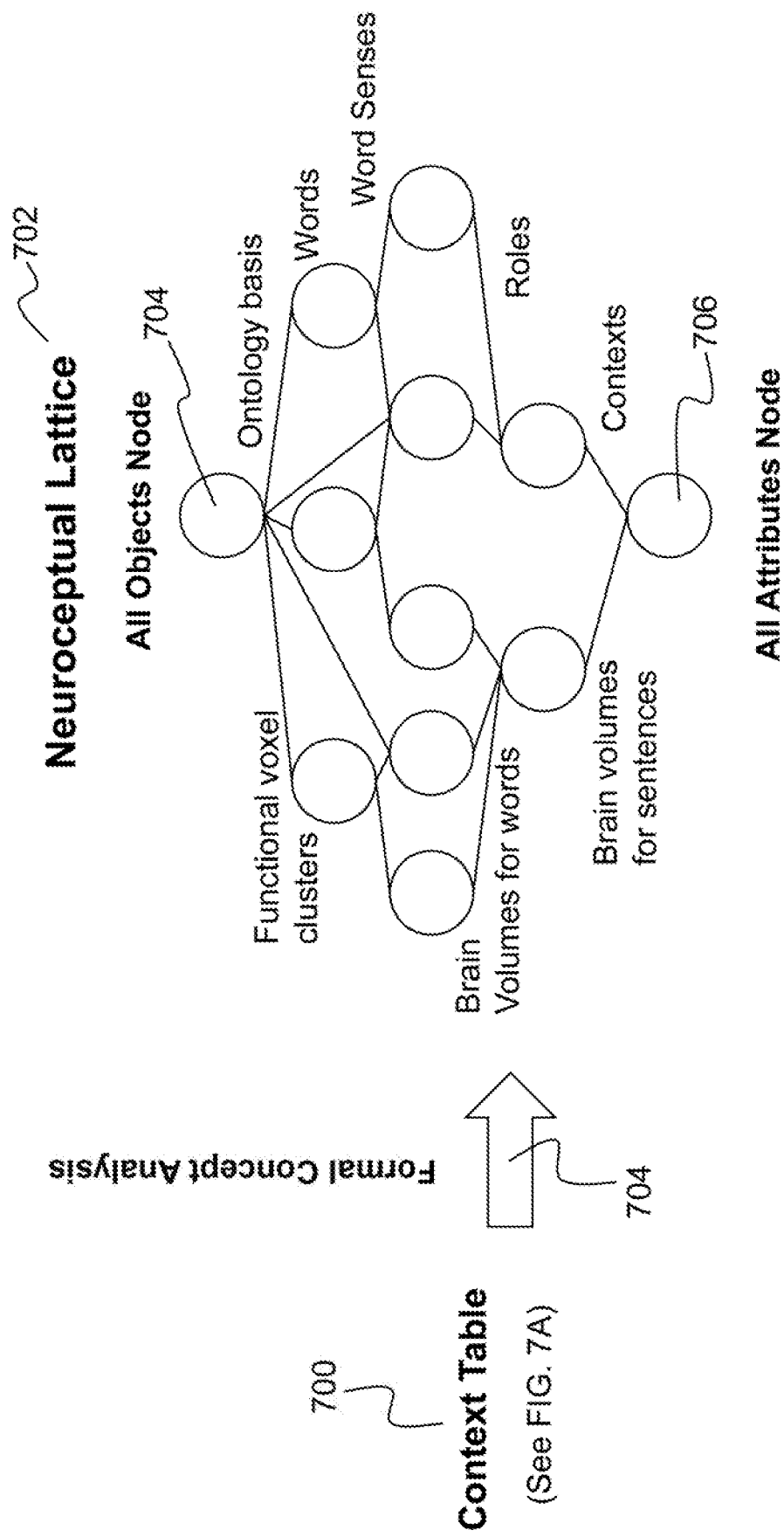
FIG. 7B is an illustration of construction of a neuroceptual lattice from the context tables in FIG. 7A according to some embodiments of the present disclosure.

As described above and illustrated in FIG. 3, the system described herein includes multiple modes for three stages: feature selection 306, neural feature extraction 302, and classification 304. The neural pathway starts with pre-processing 314 and data preparation 316, where the output is a set of beta values. These beta values are estimates of the fMRI BOLD (blood oxygen level dependent) response amplitudes, which are used to estimate the fMRI BOLD response for a given user. FIGS. 7A and 7B depict the conceptual outputs for both neural data 304 and semantic data 302 and their combination into a context table 700 to form a neuroceptual lattice 702.

Figure 6:
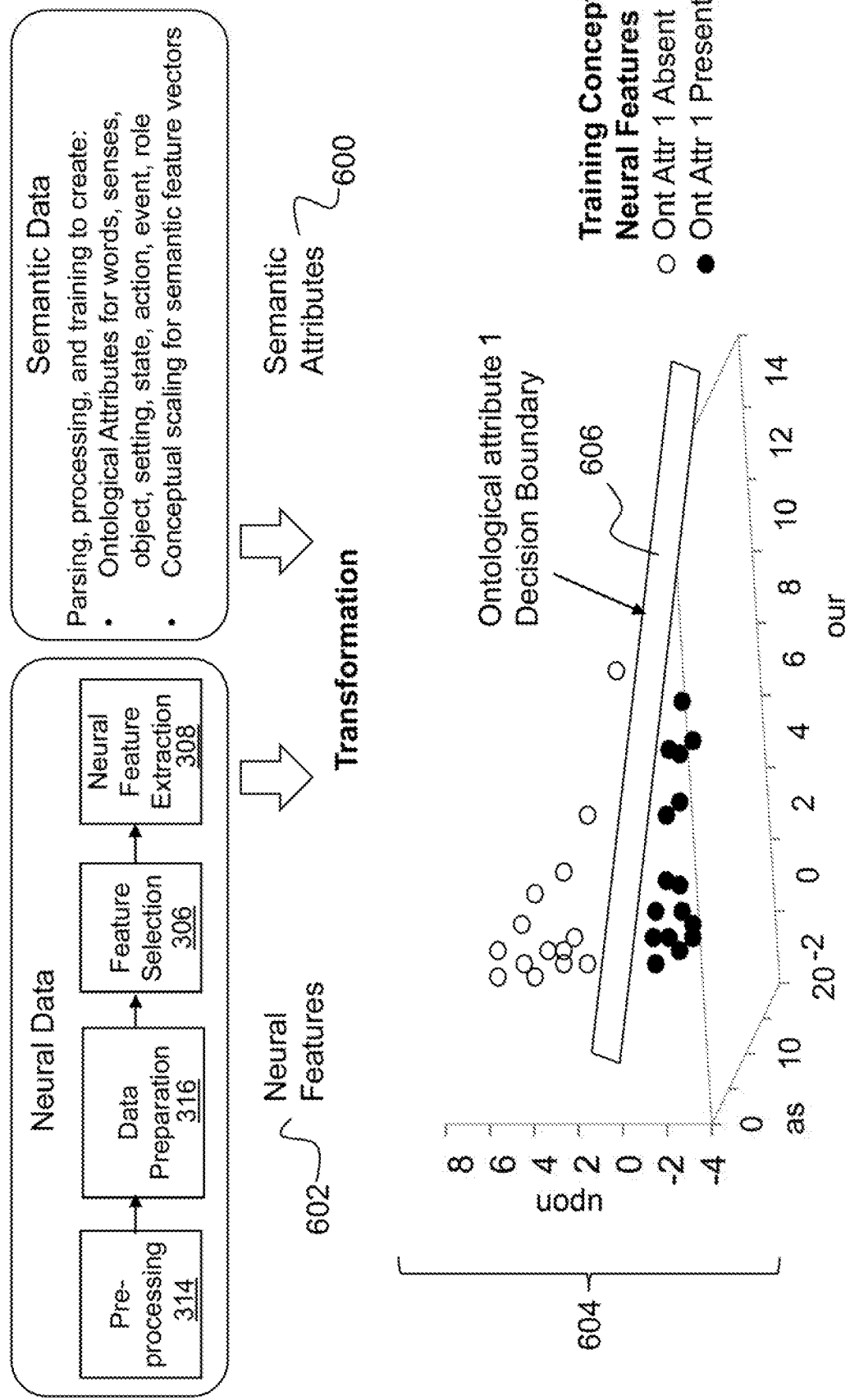
FIG. 6 is an illustration of transformation mode for the classification stage in the system according to some embodiments of the present disclosure.

In a neuroceptual lattice mode of the classification 310 stage, the first task is to extract the relevant attributes (neural attributes/features 600, semantic attributes 602 in FIG. 6) from each domain (including their hierarchical structure) to form a context table 700. To extract these attributes, challenges must be addressed in each domain, including the corruption of signal by noise and high dimensionality of signals. Although the attributes in each domain are different (columns in the context table 700), the concepts (also known as objects in formal concept analysis) are the same (rows, which are the development concepts). FIG. 6 depicts a classification plot 604 showing 2 classes (black and white dots). The classifier separates the 2 classes with a decision boundary 606.

Once the context table 700 exists for each domain (neural data 304 and semantic data 302), a lattice is built for each context table 700 (semantic lattice and neural lattice). Finally, a joint neuroceptual lattice 702 can be built from the joint context table and used for prediction and interpretation. For interpretation (i.e., neural decoding), neural data 304 passes through the neural pipeline to extract neural attributes/features 602. This collection of neural attributes 602 is used to find the corresponding node in the neuroceptual lattice 702, for which there will also exist a set of semantic attributes 600. These semantic attributes 600 can subsequently be matched to sets of attributes for development concepts, and subsequently ranked accordingly for interpretation metrics.

In a transformation mode of the classification 310 stage, a classifier, such as a support vector machine (SVM) or k-Nearest Neighbor algorithm, is trained to transform the neural data attributes 602 in the semantic data attributes 600 directly.

(4.1) Feature Selection (Element 306)

Two primary pathways exist for feature selection 306. The first pathway simply selects individual voxels using the "stable voxels" method, which essentially uses statistics (correlation) to reduce dimensionality by providing a metric for the stability of responses. The second pathway (dimensionality reduction) reduces dimensionality in the data through learning methods. Those methods can be subdivided into methods using sparse encoding, which exploit dictionary learning and methods for clustering voxels in the data, and obtaining metrics from those clusters (e.g., simply averaging voxel activity in a cluster). Other dimensionality reduction and feature learning methods, such as SCCA and searchlight methods from MVPA (multi-voxel pattern analysis), have also been examined for future use in the system according to embodiments of the present disclosure.

(4.1.1) Stable Voxels

Figure 4A:
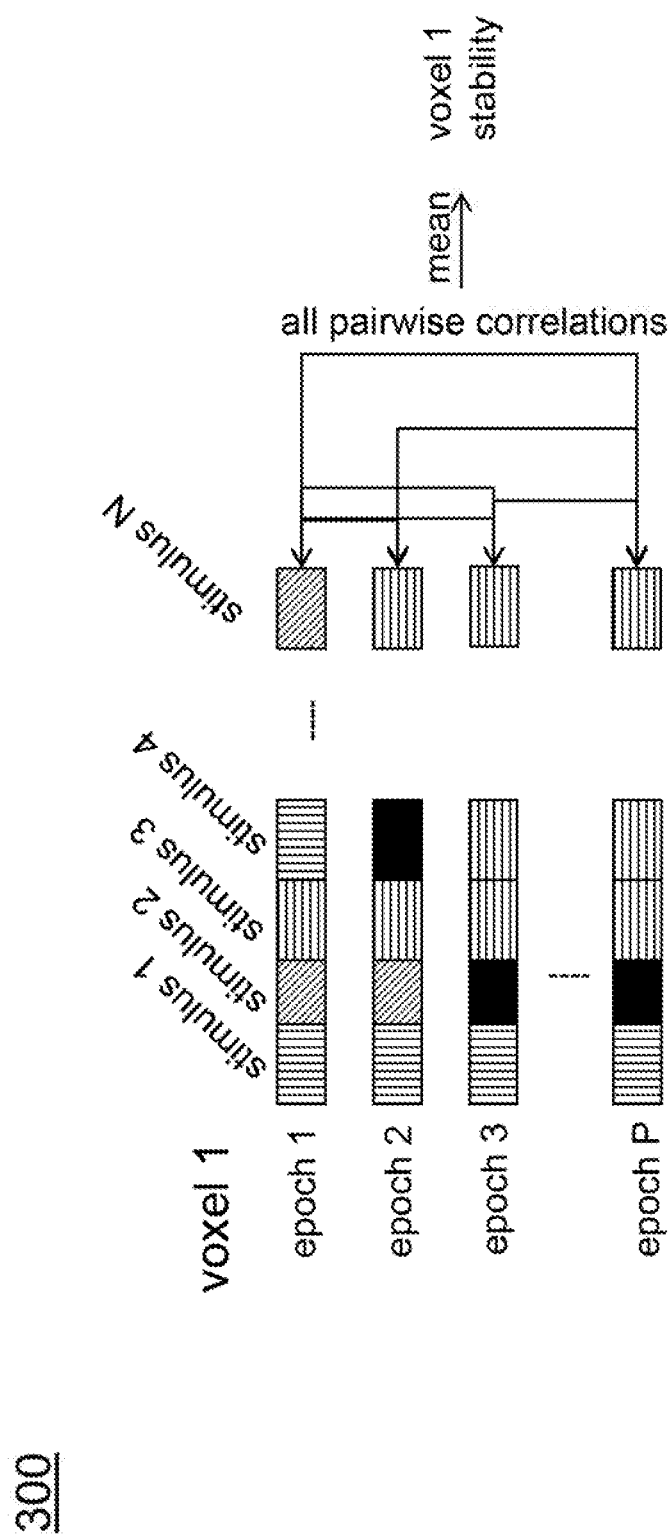
FIG. 4A is an illustration of identification of voxel I stability according to some embodiments of the present disclosure.
Figure 4B:
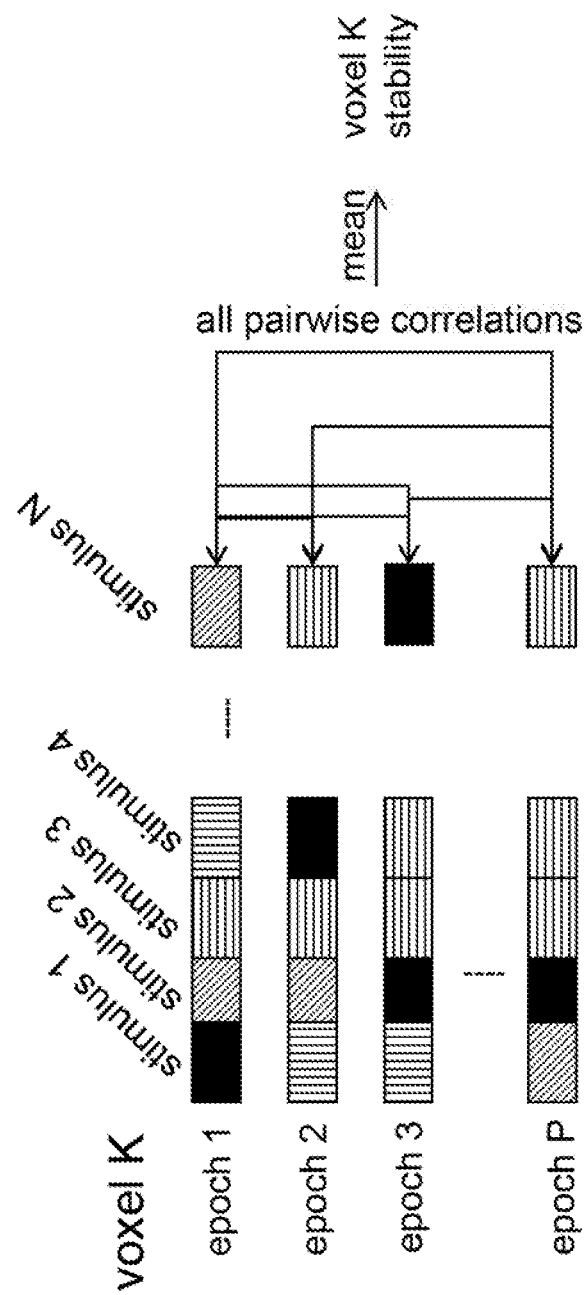
FIG. 4B is an illustration of identification of voxel K stability according to some embodiments of the present disclosure.

This method identifies voxels that have a consistent pattern of response to different stimuli across different runs or groups of runs ("epochs"), as shown in FIGS. 4A and 4B. For each epoch (e.g. epochs 1, 2, 3, P) and stimulus (e.g., stimulus 1, 2, 3, 4, and N) provided to the user, a given voxel has a certain value (indicated by the shading) corresponding to the fMRI BOLD response of the brain region associated with that voxel. For example, FIG. 4A shows the responses of brain voxel I with different stimuli applied across a set of epochs. Stability is quantified as the correlation between the patterns of responses sorted by stimulus across epochs. Pairwise correlations are determined between each pair of epochs for each voxel. The mean correlation across epochs is the stability. In cases where an epoch contains multiple instances of the same stimulus, the instances are averaged. Only responses to stimuli that occur in each epoch are considered. Voxels are sorted by decreasing stability, and the top N voxels are selected as features for classification or lattice building.

(4.1.2) Sparse Canonical Correlation Analysis (SCCA)

Figure 5A:
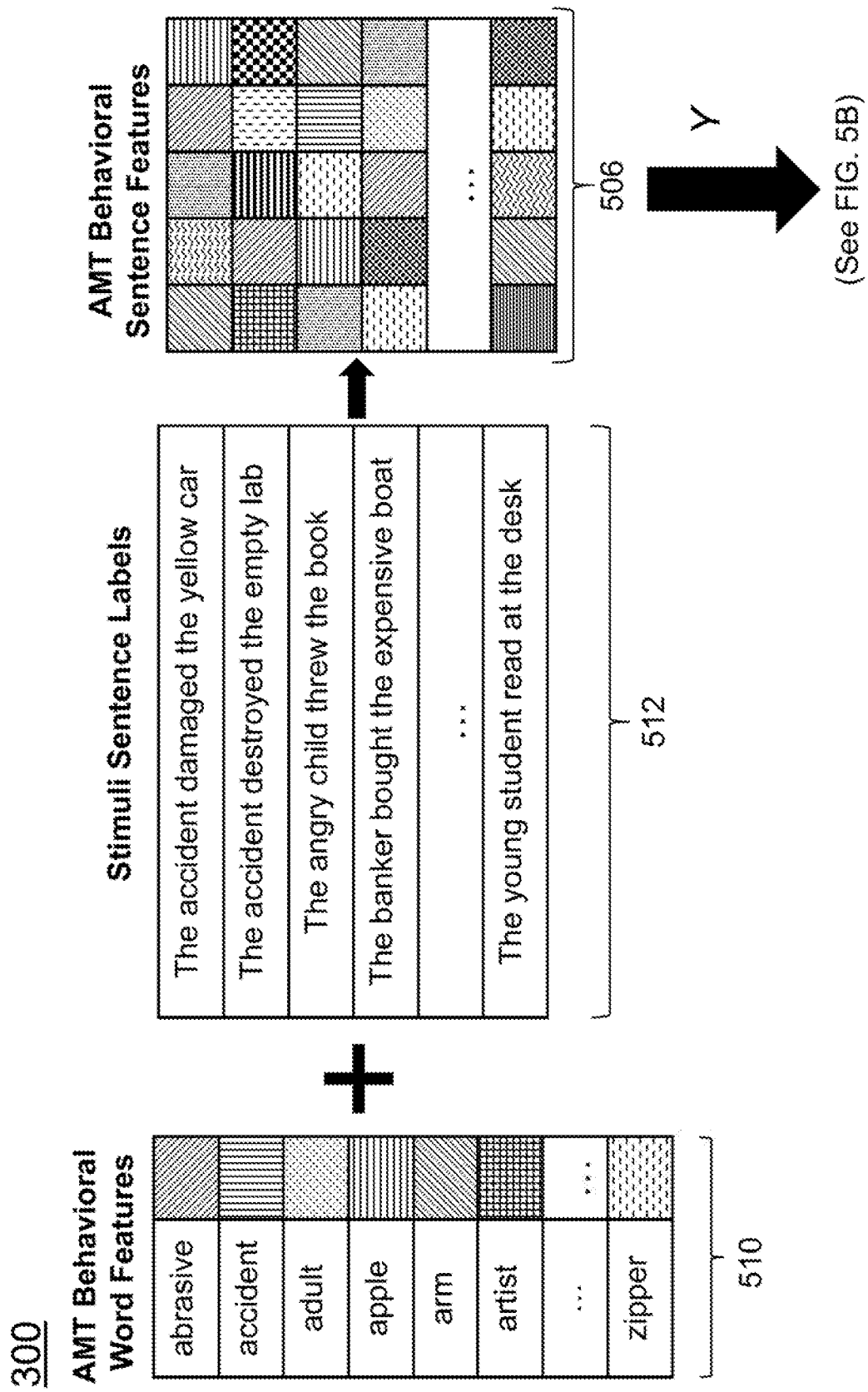
FIG. 5A is an illustration of generation of Amazon Mechanical Turk (AMT) behavioral sentence features according to some embodiments of the present disclosure.
Figure 5B:
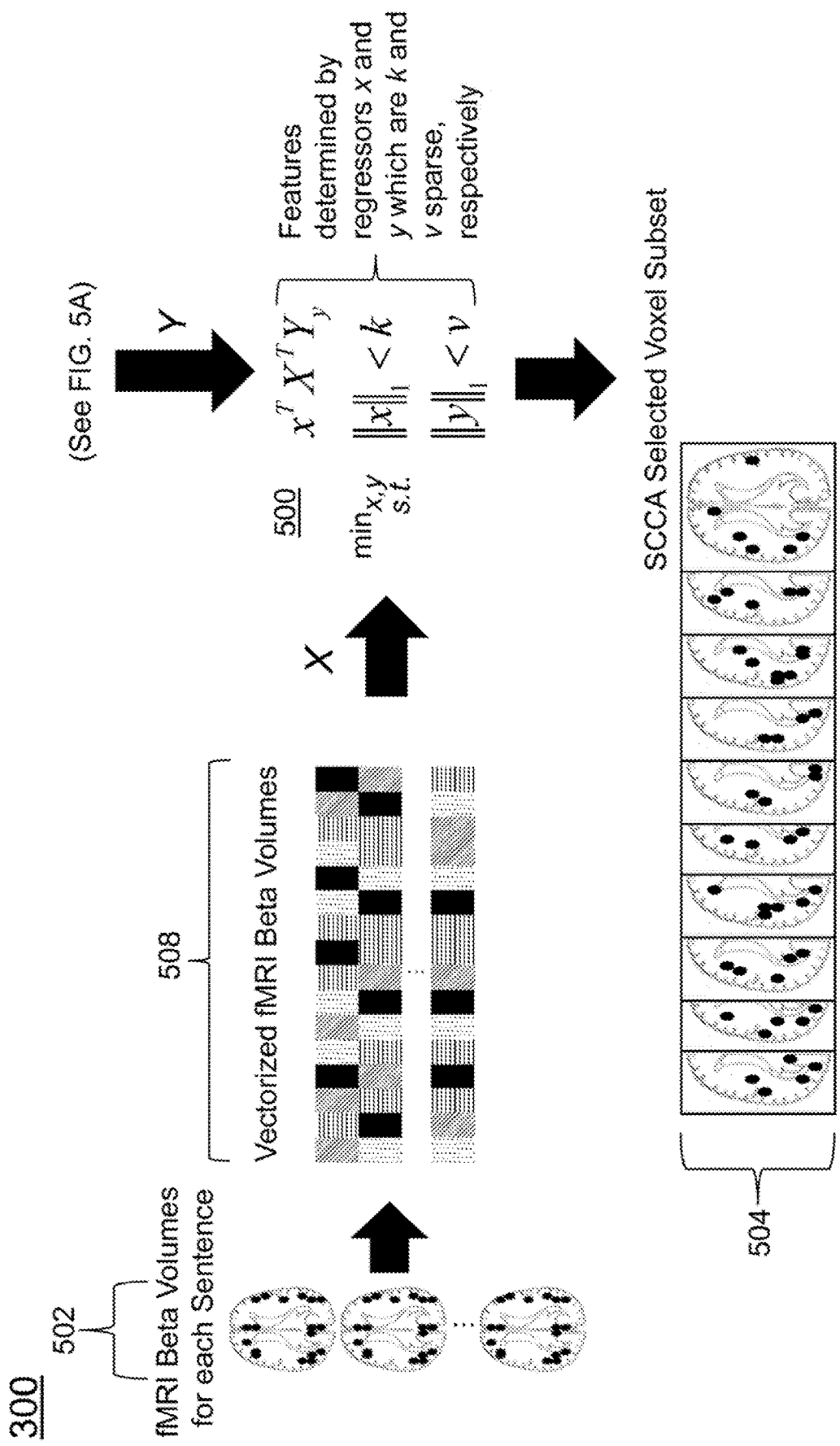
FIG. 5B is an illustration of dimensionality reduction and feature selection of neural data according to some embodiments of the present disclosure.

In the system described herein, SCCA 500 is used for dimensionality reduction and feature selection of subjects' fMRI BOLD data 502, as illustrated in FIG. 5B. Dimensionality reduction and feature selection are achieved as a pre-processing step in which matrices of semantic and neural features are both subjected to sparse singular value decomposition (SVD), similar to the sparse and low rank decomposition methods described below.

Canonical Correlation Analysis (CCA) is a classical multivariate data analysis technique that provides a framework for identifying the relationships between two or more sets of variables by maximizing the Pearson correlation between them. It determines which subsets of variables from two or more data sets are linearly correlated and contribute to maximizing the Pearson correlation. When there are multiple observations of each variable, such that X and Y are matrices of dimension n×p and n×m on the same set of n observations for p and m variables, respectively, the CCA criterion is:

$$\max_{x,y} x^T X^T Y y \quad (1)$$

$$\text{s.t.} \quad x^T X^T Y x = y^T X^T Y y = 1,$$

where x and y are regressors that sub-select which variables in datasets X and Y contribute to the maximal correlation between them. However, when p>>n (i.e., the number of variables is much greater than the number of observations, such as in fMRI data analysis) the CCA criterion must be regularized by a prior, such as $l_1$ sparsity. Sparse CCA (SCCA) 500 takes the form:

$$\max_{x,y} x^T X^T Y y - \lambda |x|_p - \gamma |y|_q, \quad (2)$$

where p and q are the sparse priors applied to the regressors on X and Y and act as a dimensionality reduction method by projecting each data set into a lower dimensional space. SCCA 500 provides a symmetric solution to the problem of finding sparse vectors that maximize the subspace correlation of two or more data sets simultaneously, which is in contrast to other sparse regression techniques that only apply sparsity to one data set in the problem. The reduced semantic and neural data matrices can then be mapped to one another by means of SCCA 500, which learns weights between the most correlated data from two or more data domains.

The addition of sparsity constraints to canonical correlation analysis mitigates the influence of outlier voxels in the neural data and is appropriate when many voxels are likely to be uninformative for neural decoding. Sparsity automatically assists in feature selection and finding the most reliable voxels. SCCA 500 frequently imposes a positivity constraint which guarantees that weights relating each of the two original data matrices to the canonical variates are positive and may thus be viewed as a weighted average of the data. The sparseness constraint influences the fraction of masked voxels that will have non-zero weights and is a free parameter, which can either be adjusted by the experimenter or chosen based on the maximization of some metric of interest. The experimenter may also adjust the $L_1$ norm ("lasso" penalty) for additional control of the sparseness of the SCCA 500 solution.

When applied to the feature selection and dimensionality reduction problems of fMRI data sets 502, SCCA 500 identifies the subset of voxels 504 that are most highly correlated with a feature subset from a corresponding multidimensional data set.

For the system according to embodiments of the present disclosure, the multi-dimensional data set prior used in SCCA 500 is the AMT Behavioral Sentence Features 506 (FIG. 5A). By mapping the reduced behavioral sentence features 506 to the fMRI volumes 502, SCCA 500 can be thought of as projecting both data sets onto a common feature space in order to determine the semantics of the underlying voxel activation to behavioral feature model. The fMRI BOLD volumes 502 are pre-processed (i.e., vectorized fMRI beta volumes 508) prior to SCCA 500, so that each volume contains the labelled beta values from GLM (generalized linear model) denoise, an automated technique and software code for denoising fMRI data.

To reduce the computational load of solving the SCCA problem, trial averaged fMRI data sets are used so there is only one volume per sentence class. The AMT Behavioral Word Features 510 contain 21 numerical features for 619 commonly used words, including each of the development words found in the 240 fMRI stimulus sentence labels 512; therefore, a row-wise label mapping must be performed between the sentence-based fMRI volumes (element 512) and the word-based AMT Behavioral Features (element 510) prior to their use in SCCA 500.

There are two methods of performing the mapping word-based, where each word in the list of AMT Behavioral Word Features 510 determines which sentence labels (element 512) contain that word and replicate the corresponding fMRI volumes and AMT behavioral feature sets so that each row in both data sets is labelled by the word and sentence-based. Each sentence in the set of fMRI volume labels (element 512) determines the set of AMT Behavioral Word Features 510 words that it contains and constructs a feature vector by concatenating the AMT Behavioral Word Features 510 for each word in sentence order so that each row in both data sets is labelled by the sentence. Both approaches work well. However, the sentence-based approach produces higher correlations between the fMRI beta volumes 502 and the AMT Behavioral Word Features 510 vectors and results in only 240 rows per data set (the size original set of stimulus sentences), which is significantly smaller than the word-based approach.

(4.2) Neural Feature Extraction (Element 308)

This set of values (i.e., correlations between the fMRI beta volumes 502 and the AMT behavioral word features 510) is then transformed to find an embedding into a lower dimensional manifold. The system contains two methods: Sparse Atomic Feature Learning (SAFL) and Sparse and Low Rank matrix decomposition (SLR) (element 800 in FIG. 8). This form represents the data that the system then interprets. The system described herein incorporates these elements for neural feature extraction 308, as described in U.S. application Ser. Nos. 14/869,907 and 14/626,915. In addition, the two neural feature extraction 308 methods can be run serially with SLR outputs feeding into a SAFL module (element 800).

(4.3) Classification (Element 310)

Figure 8:
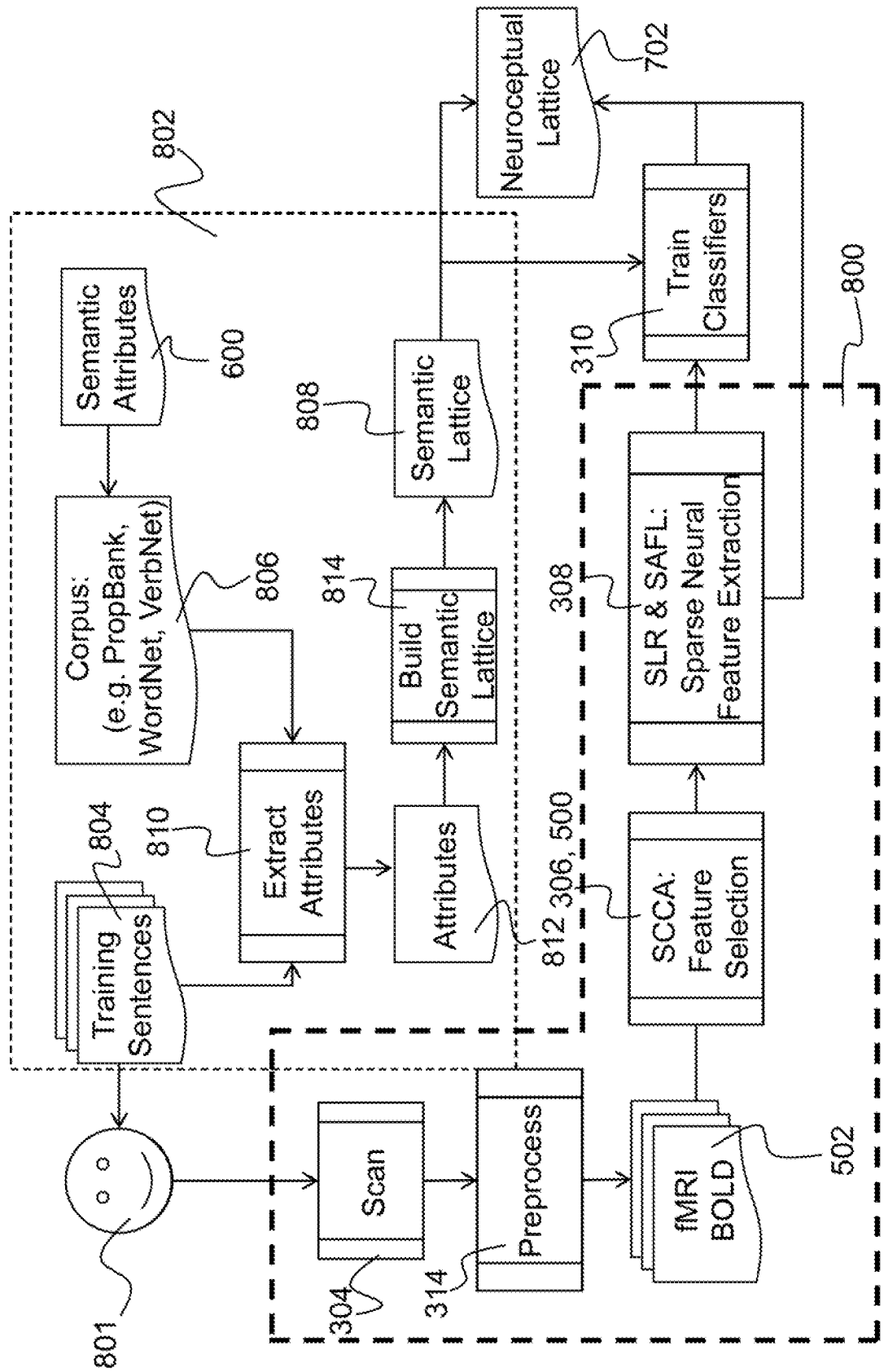
FIG. 8 is an illustration of training the system for neural decoding according to some embodiments of the present disclosure.

As shown in FIG. 8, the neural feature extraction pathway 800 and semantic pathway 802 come together for classification 310. The system can use any classifier that outputs a set of probabilities or some ranking of classes. In the system according to embodiments of the present disclosure, instead of directly classifying on all voxels, feature selection 306 is performed to learn more meaningful features from neural data 304, which are the inputs to the classification 310 stage. The classification 310 stage contains modules that can be used to directly classify the neural data 304 in two ways shown in FIGS. 6, 7A, and 7B, and described below. First, the semantic attributes 600 which are extracted from sentence data (i.e., semantic data 312) are described. The classifiers are trained with the semantic attributes 600 and neural features 602.

(4.3.1) Semantic Feature Extraction

The semantic pathway 802 is a means to take training sentences 804 (semantic data comprising complete sentences) and decompose them into a more generalizable semantic basis set via extraction of attributes (element 810). Several systems are currently being explored with plans to combine them. There is a system of ontological attributes, which come mostly from WordNet (corpus 806) and thematic roles, which comes from ClearNLP, a software tool for natural language processing (NLP). The ontological part is meant to capture semantic structure of words (extraction of attributes 810). The thematic roles are meant to capture the context and roles the words play in the context of a sentence. Finally, WordNet Domains (corpus 806) is used to capture horizontal relationships between words (e.g., a scalpel is related to doctor).

The second semantic system is based on Eigenword decomposition of the Google text corpus 806. The third semantic system is based on a Laplacian embedding of a graph derived from Microsoft Word Thesaurus. The second and third systems are statistical and don't distinguish word senses, but they capture horizontal (co-occurrence) relationships well. These systems use real-valued vectors, so values are binned to get discrete attributes from them. Using the system described herein, sentences are decomposed into various systems of semantic attributes 600 (attributes from different semantic sources are possible and implemented in the system as described in the semantic pathway 800 above). The attributes 812 that are extracted are used to build the semantic lattice 814.

(4.3.2) Classification Using Support Vector Machines (SVM)

The classes the SVM needs to recognize are lower level semantic attributes 602 (from Semantic Feature Extraction above), which form a basis set for arbitrary sentences. To train an SVM classifier to recognize these semantic attributes 600 within neural data 310, the neural data 304 for each of the decomposed sentences is duplicated. The SVM is then trained on this larger dataset that now have the semantic attributes 600 as classes instead of sentences.

In addition to the complete semantic systems described above (where each sentence is decomposed into its full set of attributes), there is also experimenting with "partial" systems. These partial systems only extract a specific subset of semantic attributes and a different classifier is trained to predict each subset separately. For example, one classifier might be trained on only verb related attributes of the sentence, while the other is trained on noun only related attributes. Preliminary results indicate that training more classifiers on a smaller space slightly improves performance. This method also allows for selection of a more specific classifier if it is known that the development word that is being ranked against an unknown brain volume is a verb.

This is a more difficult learning problem as the SVM now has duplicate samples assigned to different classes. The SVM is not used to predict a single class, but is configured to output a probability vector for each of the attribute classes. For a given sentence, it should assign a high probability to each of the attributes of the sentence. An improvement can come from subdividing the attributes and training different SVM classifiers to rank each subset. The SVM performed better when one was trained on verb related attributes and the other was trained on noun related attributes.

(4.3.3) Neuroceptual Lattice Classification

Given a set of training data, a neuroceputal lattice 702 is built using the formal concept analysis (FCA) 704 methodologies (FIG. 7B). Once the neuroceptual lattice 702 is constructed, presentations of testing data are then classified by selecting nodes from within the neuroceptual lattice 702 using various node selection techniques. The nodes then vote for a classification of the presentation, as described in U.S. application Ser. Nos. 15/150,998 and 14/807,083. Again, a number of different voting algorithms are provided. Tools for building attributes, constructing lattices, and classifying on lattices are built into the system. These efforts were validated on synthetic data sets and other well-known machine learning data sets (e.g., University of California Irvine (UCI) machine learning repository Iris data set). Other fMRI data sets were used to understand and explore the neuroceptual lattice 702 as experiments were designed and data was collected. Tools for lattice analysis have been constructed and included in the system, including apposition to bring together two lattices (e.g., neuroceptual lattice 702 from a semantic lattice 808 and a neural lattice (not shown)), lattice distance metrics to compute distance between concept nodes in the lattice, and logical implication methods to compute which attributes can imply other attributes. These studies have shown scalability and noise susceptibility problems associated with lattices, which presents the challenge of how to have a unified system that does both interpretation and prediction as well as automatically generate implications between neural features 602 and semantic features 600.

Using different semantic spaces is possible with the lattice-based classifier. In this case, each presentation is an object to which, in addition to neural attributes 602, the set of semantic attributes 600 appropriate to the semantic space used (lattice apposition) is appended. Duplicating the data is not appropriate. Once the neuroceptual lattice 702 is built, there is a very powerful joint representation of both the neural activity domain and any semantic domain. An algorithm in the system that scans the lattice and finds all implications from attributes of one domain to attributes of another domain (e.g. neural to semantic) is implemented. This algorithm also supports the concept of support and confidence. Support is a way to specify how many instances of a pattern need to exist before it is reported. Seeing a pattern where there is only one case is not as supported as if there were a thousand cases. Confidence is a way to find a pattern that doesn't have to be true all the time. Specifying a confidence of 90% means that it would report on an implication of A-B even if one out of ten times there was an A without a B. Using the lattice based approach has three technical hurdles that need to be addressed. These are scalability (it can take a long time to build some lattices), dealing with noise (now having support and confidence will help address this), and the complexity of binarizing the noisy real valued neural data. To address this, unique approaches in lattice construction, such as embedding regression lines into the nodes as attributes, and fuzzy lattices, are being considered.

(4.3.4) Training Involving Neural Data

The system described herein performs five basic stages on the neural data 304 (e.g., scan in FIG. 8) for training. Below are the basic steps for training, followed by the modules involved at each step from FIG. 3. The procedure below outlines training for a single subject.

1. Perform pre-processing stage (element 314). Data (neural data (e.g., scan 304)) from a subject 801 can be entered in a Neuroimaging Informatics Technology Initiative (NIFTI) format, but can be converted to other formats as necessary.
2. Perform data aggregation and normalization stage (i.e., data preparation 316).
3. Perform feature selection 306 (stable voxels, SCCA).
4. Perform neural feature extraction 308 (SLR, SAFL).
5. Perform classification 310 (SVM, neuroceptual lattice).

To train a decoder across all subjects, the pre-processing stage (element 314) is performed on each subject's data (element 304) alone. There are multiple options for when across subjects (subjects used across sessions) can be aggregated, one of which is described below. A Distortion Correction module that is part of the pre-processing stage (element 314) will transform each subject's data (element 304) into a common coordinate space (e.g., Montreal Neurological Institute—MNI coordinate system) in the NIFTI format, likely using ANTS software. A Data Aggregation and Normalization module would combine data across subjects. The remaining steps in the data preparation stage (element 316) (GLMDenoise and Hemodynamic Response Function (HRF) estimation), feature selection stage (element 306), neural feature extraction (element 308), and classification stage (element 310) would remain the same.

(4.3.5) Transformation Mode for Classification

The neural data 304 is transformed into a sparse, low-dimensional signal using either SLR or SAFL (neural feature extraction 306). SVM is then used to evaluate the decoding performance of the transformed signal (classification 310). SAFL operates on either single trial data or multiple trials of averaged data. SAFL exploits multiple instances of each trial to smooth the resulting structures through gradient minimization. In the system described herein, each brain volume is pooled with the other brain volumes resulting from the same stimulus type. The training data is then built from selecting a subset of the volumes to average, and repeating this process as many times as needed. For example, if 14 trials for a single sentence are given, SAFL will produce n averaged-trials where each averaged trial is the average of m of the original trials. The testing data can be built in the same way, or all the data could be averaged into a single volume. SAFL can also run on non-averaged trials.

In one embodiment, the classification 310 uses a linear SVM and outputs 312 a matrix ("scores"), where each row is an unknown fMRI data set and each column is the probability of that attribute being present in the data. The number of columns varies according to the semantic system being used. Assuming ontological attributes, there are currently 709 columns. To build the ranking matrix, this SVM attribute based matrix is transformed into a word based one. Therefore, each word's ontological attributes are looked up and used to index into scores and pull out only those columns. Those columns are averaged, producing a single number that represents how likely that word is in the unknown data, and the single number goes into the appropriate word column of the final results matrix.

(4.3.6) Neuroceptual Lattice Mode for Classification

A lattice is a very general mathematical framework. It captures the notion of a partial order, which is the essence behind measurement. Formal concept analysis (FCA) is a methodology to create a partial order via the relationship between objects and their attributes. FCA imposes ordering relations amongst the objects and attributes within the lattice. As shown in FIG. 7B, each node contains a subset of objects (the presentations) and their corresponding set of attributes. The node at the top of the lattice 704 contains all the objects and no attributes and the bottom node 706 contains all the attributes, but no objects. Attributes first enter near the top of the lattice and accumulate within nodes as you go down. The higher up an attribute first enters the more general it is (i.e., the more objects it applies to). These are attributes, such as entity, living, non-living, etc. Instead of imposing a flat set of regressors, the lattice approach maintains an ontological structure with the ability to use that structure to guide finding corresponding neural representations.

In the case of the system according to embodiments of the present disclosure, the objects are sentences (referred to as development concepts), and attributes come from two different domains: 1) semantic attributes and, 2) neural activity attributes. Since in both cases the objects are the same, lattice apposition can be used to combine the two sets of attributes and build a common space for them to coexist. The problem with this approach is that the neural data is extremely noisy, so the apposition lattice is highly confounded with relationships to noise. Lattices produced this way have hundreds of thousands of nodes and are uninterpretable. There is a scalability problem and a complexity problem. The source of both of these is related to the level of noise and how binary attributes are defined from continuous scale neural activity data. The general framework for this is called conceptual scaling. Standard approaches are inadequate to handle neural data.

In the present invention, instead of trying to determine how to bin complex noise neural data, the data is transformed into a simpler sparse lower dimensional manifold (neural feature extraction 308). These techniques include SCCA, SAFL, and SLR (described above). With these approaches, binning becomes simpler since the techniques tend to produce sparse, already close to binary types of representations. The system described herein includes the software to construct the neuroceptual lattice 702 and perform classification 310 of novel neural data with it.

(4.3.7) Testing Involving Neural Data

Figure 9:
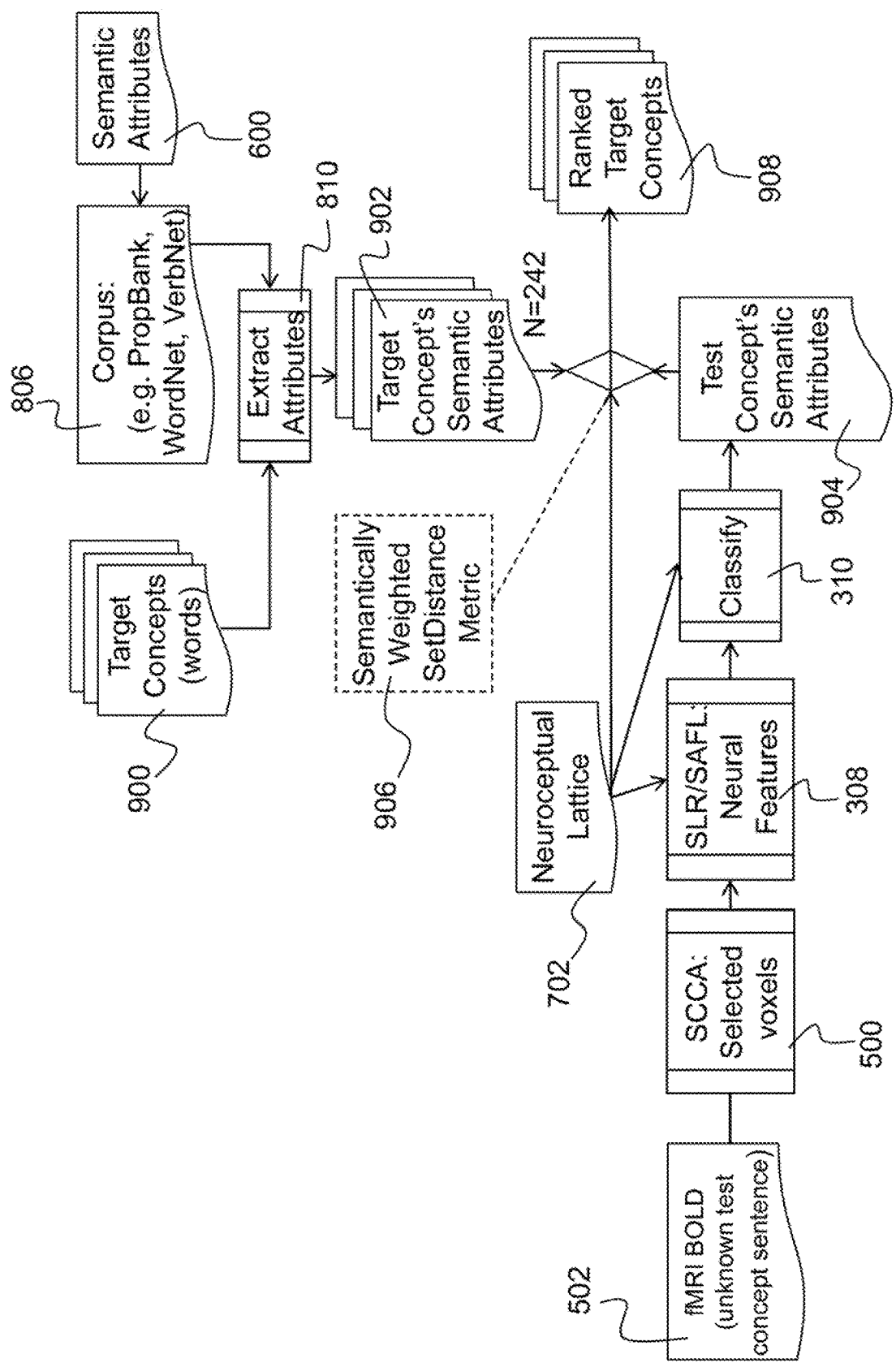
FIG. 9 is an illustration of neural decoding using the system according to some embodiments of the present disclosure.

Interpretation is based on classification (see FIG. 9). The system according to embodiments of the present disclosure can use either a SVM classifier or a neuroceptual lattice, or any other suitable classifier. A neuroceptual lattice 702 is built as described above. Classification 310 can be performed on a lattice itself. Building a neuroceptual lattice 702 after feature selection 302, where the nodes correspond to neural features 602 and semantic features 600 directly, has been explored. Classification must resolve which node amongst a number of candidate nodes has the closest match to obtain the semantic features.

As shown in FIG. 9, target concepts (i.e., words) 900 are provided as semantic data. Attributes are extracted (element 810) from the target concepts 900, resulting in target concept's semantic attributes 902. Test concept's semantic attributes 904 are then compared with the target concept's semantic attributes 902 to determine a semantically weighted distance metric 906, which is used to rank the target concepts 908.

Neuroceptual lattice classification for building a lattice using voxel values directly, where nodes correspond to learned ranges of values, or bins, for the corresponding semantic features, has been examined. The SAFL module in neural feature extraction (element 308) can also create a neuroceptual lattice 702 from the output matrix "A", where neuroceptual lattice classification techniques may be used to interpret an incoming brain volume, obtain the activated set of attributes, and vote on the activated nodes in the lattice. The case of the SVM classifier is similar. The classifier is trained on SAFL's "A" matrix copying and labeling the data according to the semantic attribute system used.

The classification stage (element 310) automates the building of the classifier, as well as controlling data folding, classification, and analysis of results. This stage also facilitates research on transforming the real-valued neural signals into binary attributes through different binning methodologies (conceptual scaling). The results of this attribute selection step are utilized as the neural attributes 602.

The ability to decode neural signals is of commercial interest. It can be used to learn and represent the mapping between neural data from individuals, or groups, and other data sources. These other data sources can be semantic data (words and concepts), as practiced in this invention, or visual data (images and movies), as seen in prior art (see Literature Reference No. 1). Particular system elements, such as the discovery of sparse neural representations, are more generally useful, as they can also be used for simpler data sources such as control signals for interfaces.

As a non-limiting application of the invention described herein, vehicle manufacturers can apply the present invention for human machine interfaces, where neural decoding can be used for controlling vehicle systems (steering, braking, climate, radio, etc.) by decoding the driver's neural activity. The capability is useful for building unobtrusive, high throughput human-machine interfaces, which can be used for land or air vehicle control, command, and control interfaces in applications with complex interfaces, such as cyber defense, intelligence analysis, or applications where decoding user's thoughts or intent is useful. Further, the system can be used as an analytical tool to understand which interface elements are represented more strongly or reliably in neural signals than others.

Additionally, applications where the system can be useful include neural prosthetic systems, which are designed to decode user intent, and decoding the content of thoughts (e.g., locked-in patients). Interpretation systems can also be used in contexts outside of intent, such as decoding memory. Furthermore, the system can be used as an analytical tool to understand which data source elements (e.g., semantic features or visual features) are represented more strongly or reliably in neural signals than others.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for neural decoding, the system comprising; one or more processors and a non-transitory computer-readable medium having executable instructions encoded thereon such that when executed, the one or more processors perform operations of:
using at least one neural feature extraction method, transforming the neural data into sparse neural representations, the neural data being correlated with a set of behavioral data;
extracting a set of semantic features from a set of semantic data;
using a combination of distinct classification modes, mapping the set of semantic data to the sparse neural representations,
wherein in a first classification mode, learning a transformation between the set of semantic data and the sparse neural representations,
where in learning the transformation between the set of semantic data and the sparse neural representations, the one or more processors perform operations of:
using a linear support vector machine (SVM) to generate a SVM matrix of rows and columns, wherein each row in the SVM matrix represents unknown sparse neural representations and each column represents a probability of that sparse neural representation being present in the set of semantic data;

transforming the SVM matrix into a semantic-based matrix, wherein for each word in the set of semantic data, its ontological attributes are determined and indexed into columns to generate the semantic-based matrix;

averaging the columns of the semantic-based matrix to produce a value representing how likely the word is in the unknown sparse neural representations; and generating a ranking matrix comprising values representing a plurality of words in the set of semantic data; and decoding new input neural data.

2. The system as set forth in claim 1, wherein a plurality of neural feature extraction methods are used serially.

3. The system as set forth in claim 1, wherein the one or more processors further perform operations of:

training the distinct classification modes with the set of behavioral data, the set of semantic data, and the sparse neural representations; and in a second classification mode, performing neuroceptual lattice classification.

4. The system as set forth in claim 3, wherein the one or more processors further perform an operation of generating a ranked list of words from new input neural data using the trained classification modes.

5. The system as set forth in claim 1, wherein in selecting a subset of neural data, the one or more processors further perform at least one of:

sorting voxels from a set of neural data by stability, and selecting a subset of voxels determined to be most stable; and identifying a subset of voxels from the set of neural data that is correlated with a feature subset in the set of behavioral data using sparse canonical correlation analysis (SCCA).

6. The system as set forth in claim 1, wherein the new input neural data is neural activity of a driver of a vehicle, wherein neural decoding of the driver's neural activity is used to control at least one component of the vehicle.

7. The system as set forth in claim 1, wherein the neural data includes functional magnetic resonance imaging (fMRI) data.

8. A computer implemented method for neural decoding, the method comprising an act of:

causing one or more processors to execute instructions encoded on a non-transitory computer-readable medium, such that upon execution, the one or more processors perform operations of:

using at least one neural feature extraction method, transforming the neural data into sparse neural representations, the neural data being correlated with a set of behavioral data;

extracting a set of semantic features from a set of semantic data;

using a combination of distinct classification modes, mapping the set of semantic data to the sparse neural representations, wherein in a first classification mode, learning a transformation between the set of semantic data and the sparse neural representations, where in learning the transformation between the set of semantic data and the sparse neural representations, the one or more processors perform operations of:

using a linear support vector machine (SVM) to generate a SVM matrix of rows and columns, wherein each row in the SVM matrix represents unknown sparse neural representations and each column represents a probability of that sparse neural representation being present in the set of semantic data;

transforming the SVM matrix into a semantic-based matrix, wherein for each word in the set of semantic data, its ontological attributes are determined and indexed into columns to generate the semantic-based matrix;

averaging the columns of the semantic-based matrix to produce a value representing how likely the word is in the unknown sparse neural representations; and generating a ranking matrix comprising values representing a plurality of words in the set of semantic data; and decoding new input neural data.

9. The method as set forth in claim 8, wherein a plurality of neural feature extraction methods are used serially.

10. The method as set forth in claim 8, wherein the one or more processors further perform operations of:

training the distinct classification modes with the set of behavioral data, the set of semantic data, and the sparse neural representations; and in a second classification mode, performing neuroceptual lattice classification.

11. The method as set forth in claim 10, wherein the one or more processors further perform an operation of generating a ranked list of words from new input neural data using the trained classification modes.

12. The method as set forth in claim 8, wherein in selecting a subset of neural data, the one or more processors further perform at least one of:

sorting voxels from a set of neural data by stability, and selecting a subset of voxels determined to be most stable; and identifying a subset of voxels from the set of neural data that is correlated with a feature subset in the set of behavioral data using sparse canonical correlation analysis (SCCA).

13. The method as set forth in claim 8, wherein the new input neural data is neural activity of a driver of a vehicle, wherein neural decoding of the driver's neural activity is used to control at least one component of the vehicle.

14. The method as set forth in claim 8, wherein the neural data includes functional magnetic resonance imaging (fMRI) data.

15. A computer program product for neural decoding, the computer program product comprising:

a non-transitory computer-readable medium having executable instructions encoded thereon, such that upon execution of the instructions by one or more processors, the one or more processors perform operations of:

using at least one neural feature extraction method, transforming the neural data into sparse neural representations, the neural data being correlated with a set of behavioral data;

extracting a set of semantic features from a set of semantic data;

using a combination of distinct classification modes, mapping the set of semantic data to the sparse neural representations, wherein in a first classification mode, learning a transformation between the set of semantic data and the sparse neural representations,
where in learning the transformation between the set of semantic data and the sparse neural representations, the one or more processors perform operations of:
using a linear support vector machine (SVM) to generate a SVM matrix of rows and columns, wherein each row in the SVM matrix represents unknown sparse neural representations and each column represents a probability of that sparse neural representation being present in the set of semantic data;
transforming the SVM matrix into a semantic-based matrix, wherein for each word in the set of semantic data, its ontological attributes are determined and indexed into columns to generate the semantic-based matrix;
averaging the columns of the semantic-based matrix to produce a value representing how likely the word is in the unknown sparse neural representations; and
generating a ranking matrix comprising values representing a plurality of words in the set of semantic data; and
decoding new input neural data.

16. The computer program product as set forth in claim 15, wherein a plurality of neural feature extraction methods are used serially.

17. The computer program product as set forth in claim 15, further comprising instructions for causing the one or more processors to further perform operations of:
training the distinct classification modes with the set of behavioral data, the set of semantic data, and the sparse neural representations;
and
in a second classification mode, performing neuroceptual lattice classification.

18. The computer program product as set forth in claim 17, further comprising instructions for causing the one or more processors to further perform an operation of generating a ranked list of words from new input neural data using the trained classification modes.

19. The computer program product as set forth in claim 15, further comprising instructions for causing the one or more processors in selecting a subset of neural data to further perform at least one of:
sorting voxels from a set of neural data by stability, and selecting a subset of voxels determined to be most stable; and
identifying a subset of voxels from the set of neural data that is correlated with a feature
subset in the set of behavioral data using sparse canonical correlation analysis (SCCA).

* * * * *